(12) United States Patent
Friggstad et al.

(10) Patent No.: US 6,192,994 B1
(45) Date of Patent: Feb. 27, 2001

(54) LIFT ASSIST MECHANISM FOR A FORWARDLY FOLDING PLANTING IMPLEMENT

(75) Inventors: Terrance A. Friggstad, Grasswood; David R. Hundeby, Saskatoon, both of (CA)

(73) Assignee: Flexi-Coil Ltd., Saskatoon (CA)

(*) Notice: Subject to any disclaimer, the term of this patent is extended or adjusted under 35 U.S.C. 154(b) by 0 days.

(21) Appl. No.: 09/437,758

(22) Filed: Nov. 10, 1999

Related U.S. Application Data

(60) Provisional application No. 60/108,025, filed on Nov. 12, 1998.

(51) Int. Cl.[7] .................... A01B 73/06; A01B 73/04
(52) U.S. Cl. ................. 172/311; 172/456; 172/463; 172/467; 172/474; 172/478; 172/479; 172/481
(58) Field of Search ...................... 172/311, 452, 172/456, 463, 467, 474, 478, 479, 481, 662, 668; 111/163

(56) References Cited

U.S. PATENT DOCUMENTS

| | | | |
|---|---|---|---|
| 3,608,646 | * | 9/1971 | Ryan ..................... 172/500 |
| 3,990,521 | * | 11/1976 | Ankenman et al. ........... 172/456 X |
| 4,896,732 | * | 1/1990 | Stark ..................... 172/311 |
| 5,024,279 | * | 6/1991 | Warner et al. ............. 172/456 X |
| 5,232,054 | * | 8/1993 | Van Blaricon et al. ....... 172/456 X |
| 5,398,771 | * | 3/1995 | Hornung et al. ............ 172/311 |
| 5,488,996 | * | 2/1996 | Barry et al. .............. 172/311 |
| 5,524,712 | * | 6/1996 | Balmer .................... 172/311 |
| 5,641,026 | * | 6/1997 | Balmer .................... 172/311 X |
| 5,660,237 | * | 8/1997 | Boyko et al. .............. 172/456 X |
| 5,787,988 | * | 8/1998 | Harlan et al. ............. 172/456 X |
| 6,021,853 | * | 2/2000 | Atkins .................... 172/486 X |

\* cited by examiner

Primary Examiner—Christopher J. Novosad
(74) Attorney, Agent, or Firm—Larry W. Miller; J. William Stader

(57) ABSTRACT

An agricultural implement, having a tool bar that is pivoted forwardly to initiate the conversion of the implement from a working position toward a transport position, including left and right wing members extending in opposing directions to respective distal ends, is provided with a lift assist mechanism to support the distal ends of the wing members as the tool bar is pivoted forwardly to an intermediate transport position. The lift assist mechanism includes a frame pivotally mounted to each respective wing member, a lift assist wheel providing ground-engaging support for the wing member, and a lift assist actuator that controls the pivoted movement of the lift assist mechanism to maintain the lift assist wheel in supporting contact with the ground until the tool bar has been rotated approximately 60 degrees from the lowered working position toward the raised intermediate transport position. A cable extends from the lift assist mechanism to a toll bar lock apparatus to release the tool bar lock only when the lift assist mechanism has been positioned for proper support of the wing member during the pivotal movement of the tool bar from the intermediate position rearwardly into the working position. A hydraulic circuit controls the operation of the lift assist actuators and the tool bar actuators to effect a coordinated action between them so as to maintain proper support for the wing member during the pivotal movement of the tool bar.

19 Claims, 27 Drawing Sheets

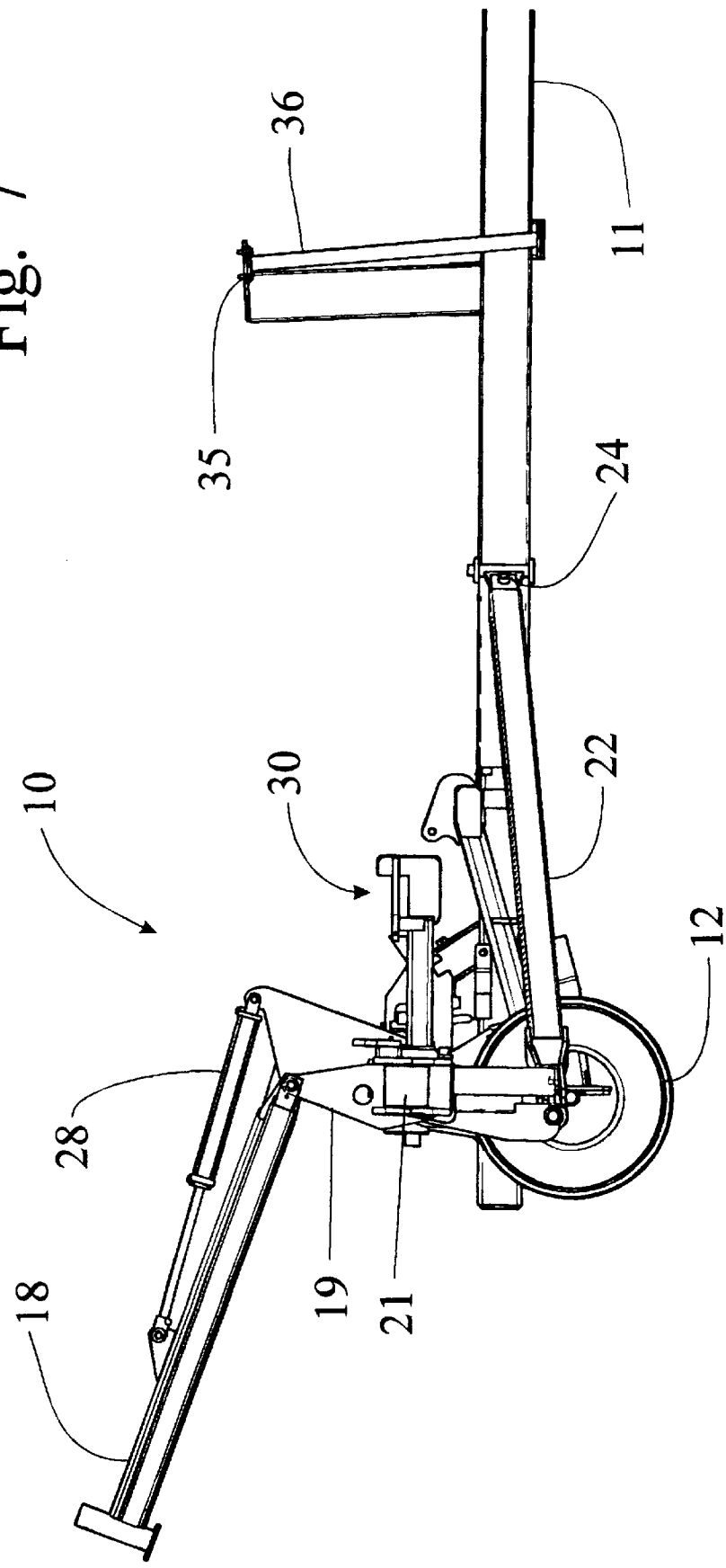

LIFT ASSIST MECHANISM FOR A FORWARDLY FOLDING PLANTING IMPLEMENT

CROSS-REFERENCE TO RELATED APPLICATIONS

This application claims domestic priority of U.S. Provisional Patent Application Serial No. 60/108,025, filed on Nov. 12, 1998, the contents of which are incorporated herein by reference.

BACKGROUND OF THE INVENTION

This invention relates generally to agricultural implements, including ground working apparatus, such as planters, and transversely elongated tool bars for supporting the ground working devices, and, more particularly, to a forwardly folding tool bar convertible between a wide, transversely extending operating configuration and a narrow, compact transport configuration.

The need to till and cultivate soil for the planting and growing of crops has been a long established practice in agriculture. More recently developed tillage implements have provided increased size and complexity to accommodate different types of crops and the tractors that tow the tillage implements to cover larger areas of soil. Increasing concerns for conservation of natural resources have also had an impact on the design of modern tillage implements, increasing the complexity of these implements. Planters of substantially equal transverse width have also been developed to work in conjunction with these tillage implements, or independently. More typically, large planting implements are operatively coupled with air carts to provide a substantial source of seed and fertilizer for the large demand accompanying such large planting implements.

Larger tillage and planting implements allow an operator to perform the required tillage operations over a larger area for each pass of the implement, permitting fuel conservation for the tractor and resulting in less compaction of the soil. The increasing levels of sophistication in tillage implements enable low-till and no-till planting techniques to be utilized with greater success. Since low-till and no-till planting techniques are preferably accomplished with a single pass of the implement over the field, the soil is disturbed only once, minimizing moisture loss and the amounts of pesticides, herbicides and fertilizer that are required. Such larger and more complex tillage implements introduce problems that have been heretofore unknown in the arts.

For example, an agricultural tractor could pull a planting implement. Adding an air cart or a seed/fertilizer supply cart to the planting implement increases the weight of the combined implement and requires the tractor and operator to be able to control all of the functions of the combined implement as the single pass is made over the field to plant seeds, place fertilizer into the ground at the proper location, and apply appropriate amounts of herbicides and/or pesticides. Furthermore, that combined implement must be transported from field to field, usually over public highways, requiring the combined implement to be converted into a transport configuration that is substantially narrower in width than the preferred operating configuration of the combined implement.

It would be desirable to provide a tool bar for a tillage or planting implement with the capability of folding from a wide, transversely extending operating position to a narrow, compact transport configuration, requiring interacting latches and actuating devices to facilitate the conversion of the tillage implement and to keep the implement in the transport configuration while being towed from one field to another.

SUMMARY OF THE INVENTION

It is an object of the instant invention to provide a tool bar that is convertible between a wide transverse field operating configuration and a transversely narrow transport configuration.

It is another object of this invention to provide a tool bar that pivots in a forward direction to re-orient pivot axes and hydraulic actuators to allow the transversely extending wing members to fold forwardly into a transport configuration.

It is a feature of this invention that the wing members fold forwardly instead of rearwardly to reach a transport configuration.

It is an advantage of this invention that an air cart or other mechanism can be towed behind the tool bar without interfering with the conversion of the tool bar between field operating and transport configurations.

It is still another object of this invention to provide a transport lock mechanism for use with a forwardly folding tool bar apparatus.

It is another feature of this invention that the transport lock mechanism and a caster wheel lock mechanism are operatively interconnected to assist in converting the tool bar between field operating and transport configurations.

It is another advantage of this invention that the actuation of the transport lock simultaneously effects actuation of the caster wheel lock for the ends of the wing members.

It is still another feature of this invention that a single spring biases both the transport lock mechanism and the caster lock mechanism.

It is still another advantage of this invention that the spring is operable to bias the wing latch hook into a closed position when the implement is moving into the transport position and is operable to bias the caster lock into a locking position when the implement is moving into the field operating position.

It is still another feature of this invention that a single hydraulic cylinder is capable of actuating both the transport lock mechanism and the caster lock mechanism.

It is yet another object of this invention to improve stability of the implement when in a forwardly folded transport configuration.

It is yet another feature of this invention that the draw bar is telescopic to lengthen when in a folded transport configuration, while providing a shorter draw bar during operation to improve the stability of the implement, particularly when towing a cart behind the implement.

It is still another advantage of this invention to provide improved maneuverability of the implement around turns during operation.

It is yet another feature of this invention that the implement is provided with a brace interconnecting the pivotable wing members and the draw bar to enhance the stability of the implement in the field operating position, which braces effect the telescoping of the draw bar when the wing members are folded forwardly into a transport configuration.

It is yet another advantage of this invention that the telescopic draw bar is provided with a hitch latching mechanism that is cooperable with the transport lock mechanism to release the draw bar for telescopic movement when the implement is folded into the transport configuration.

It is yet another advantage of this invention that the telescopic draw bar is lengthened automatically when the implement is placed into a transport position.

It is a further object of this invention to provide a mechanism to allow the wing members to float vertically to follow ground undulations when in the field operating position.

It is a further feature of this invention to provide an unfold finger that is cooperable with the wing fold hydraulic cylinders when the implement is moving into the field operating configuration to allow the wing fold cylinders to fold the wing members outwardly, but retracted when the implement is placed in the field operating position to allow the wing fold cylinders to move with the floating wing members.

It is a further advantage of this invention that the unfold finger is pivotally mounted in a support structure that moves the unfold finger into an interfering position with respect to the opposing wing fold hydraulic cylinders when the actuators are retracted for folding the wings forwardly, and operates in conjunction with the actuators when the wings are unfolded rearwardly to a laterally extending field working position, and is retracted into a non-interfering position when the tool bar is rotated downwardly into an operative position.

It is still a further object of this invention to provide a lock mechanism for the tool bar to fix the tool bar in a forwardly rotated position.

It is still a further feature of this invention that the tool bar lock mechanism is actuated by a cable apparatus that is coupled to the wing members to allow a spring loaded clasp member to be moved into an unlocking position when the wing members are unfolded rearwardly into a field operating configuration.

It is yet a further object of this invention to provide a method of converting an agricultural implement between a field operating position and a transport position by first forwardly pivoting the tool bar and then forwardly pivoting laterally extending wing members against the draw bar.

It is still a further object of this invention to provide a lift assist mechanism for implements having a large lateral working width so that the tool bar can be rotated into an intermediate transport position before effecting a forward folding of the wing members.

It is yet a further feature of this invention that the remote distal ends of the opposing wing members are supported by the lift assist mechanism as the tool bar is rotated toward the intermediate transport position.

It is still another advantage of this invention that the weight of the tool bar on the tool bar actuators is lessened to enhance the pivotal movement of the tool bar into an intermediate transport position.

It is a further advantage of this invention that the lift assist mechanism supports the distal end of the wing members until the center of gravity is such that the tool bar actuators can effectively pivot the entire tool bar.

It is a further feature of this invention that the lift assist mechanism supports the distal end of the wing members until approximately 60 degrees of rotation has been attained by the tool bar.

It is still a further advantage of this invention that the lift assist mechanism enables conventional four inch diameter hydraulic actuators to rotate a 60 foot wide tool bar.

It is still another advantage of this invention that the lift assist mechanism alleviates stress in the wing folding joints on 60 foot tool bars.

It is yet a further object of this invention to provide an interlock between the lift assist mechanism and the transport lock for the tool bar so that the tool bar is not released for rotation until the lift assist mechanism has been oriented into a desired position.

It is still a further feature of this invention that a cable interconnects the lift assist mechanism and the tool bar transport lock to effect an unlatching of the tool bar transport lock when the lift assist mechanism is properly oriented.

It is still another object of this invention to provide a hydraulic system for effecting the conversion of the implement between a field operating position and a transport position.

It is yet a further advantage of this invention that the hydraulic system for converting the implement between field operating and transport positions is powered by conventional tractor hydraulic remotes.

It is still another feature of this invention that the hydraulic system incorporates a selector valve to switch the hydraulic circuit between a fold circuit and a planter drive circuit.

It is yet another feature of this invention that the hydraulic system includes a second circuit for controlling the operation of the rotation of the tool bar and lift assist mechanism once the first circuit has been switched into a mode for folding and unfolding the implement.

These and other objects, features and advantages can be accomplished according to the instant invention by an agricultural implement, having a tool bar that is pivoted forwardly to initiate the conversion of the implement from a working position toward a transport position, including left and right wing members extending in opposing directions to respective distal ends, which is provided with a lift assist mechanism to support the distal ends of the wing members as the tool bar is pivoted forwardly to an intermediate transport position. The lift assist mechanism includes a frame pivotally mounted to each respective wing member, a lift assist wheel providing ground-engaging support for the wing member, and a lift assist actuator that controls the pivoted movement of the lift assist mechanism to maintain the lift assist wheel in supporting contact with the ground until the tool bar has been rotated approximately 60 degrees from the lowered working position toward the raised intermediate transport position. A cable extends from the lift assist mechanism to a toll bar lock apparatus to release the tool bar lock only when the lift assist mechanism has been positioned for proper support of the wing member during the pivotal movement of the tool bar from the intermediate position rearwardly into the working position. A hydraulic circuit controls the operation of the lift assist actuators and the tool bar actuators to effect a coordinated action between them so as to maintain proper support for the wing member during the pivotal movement of the tool bar.

BRIEF DESCRIPTION OF THE DRAWINGS

The advantages of this invention will be apparent upon consideration of the following detailed disclosure of the invention, especially when taken in conjunction with the accompanying drawings wherein:

FIG. 7 is a side elevational view of the implement shown in FIGS. 6A–D with the tool bar fully rotated into an intermediate transport position;

DETAILED DESCRIPTION OF THE PREFERRED EMBODIMENT

Figure 1:
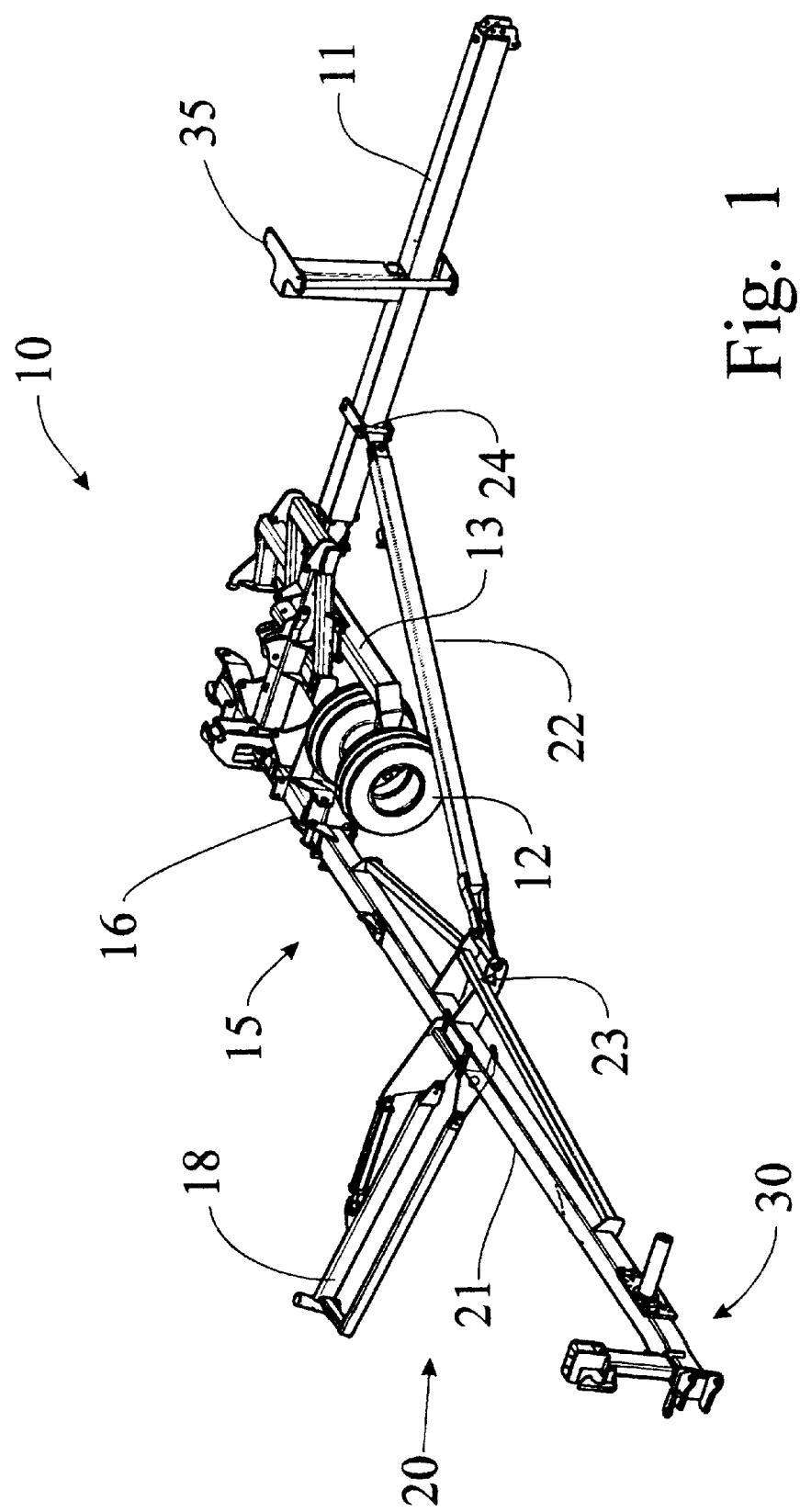
FIG. 1 is a schematic right side perspective view of a 60 foot version of a tool bar for a planting implement incorporating the principles of the instant invention, only the pivotable right wing member of the tool bar being depicted along with the lift assist mechanism being depicted as supported on the wing member.

Referring now to FIGS. 1–9, a planting implement incorporating the principles of the instant invention, can best be seen. Left and right references are used as a matter of convenience and are determined by standing at the rear of the implement facing the tractor to which the implement is to be connected and, therefore, the normal direction of travel. One skilled in the art will readily realize that the planting implement incorporates a tool bar of the folding kind that extends laterally to each side of a centerline for distances of 15 to 30 feet or more. This folding planting implement 10 is provided with left and right wing assemblies 20 on which are mounted a plurality of gang sub-frames 18 on which are mounted tillage and/or planting devices 19a to work the ground and plant seeds, fertilizer, etc as the implement 10 passes over the ground. For purposes of clarity, only the right wing assembly 20 is depicted in the drawings in schematic form. The left wing assembly would be a mirror image of the right wing assembly 20.

The planting implement 10 includes a draw bar 11 supported by ground engaging wheels 12 mounted on a transverse cross frame member 13. The draw bar 11 is conventionally mounted to a tractor (not shown) to provide motive power for pulling the implement 10 across the field. The tractor (not shown) also provides a source of hydraulic fluid under pressure to power the operation of the hydraulic devices on the implement 10, as will be described in greater detail below. The implement 10 further includes a transversely extending tool bar 15 that is pivotally connected to the draw bar 11 to rotate about a transverse pivot axis 14, best seen in FIGS. 16–18. The tool bar 15 is articulated and includes a center section 16 and left and right wing members 21 pivotally connected to the center section 16 for pivotal movement relative thereto about a wing pivot axis 17, as will be described in greater detail below.

Figure 2:
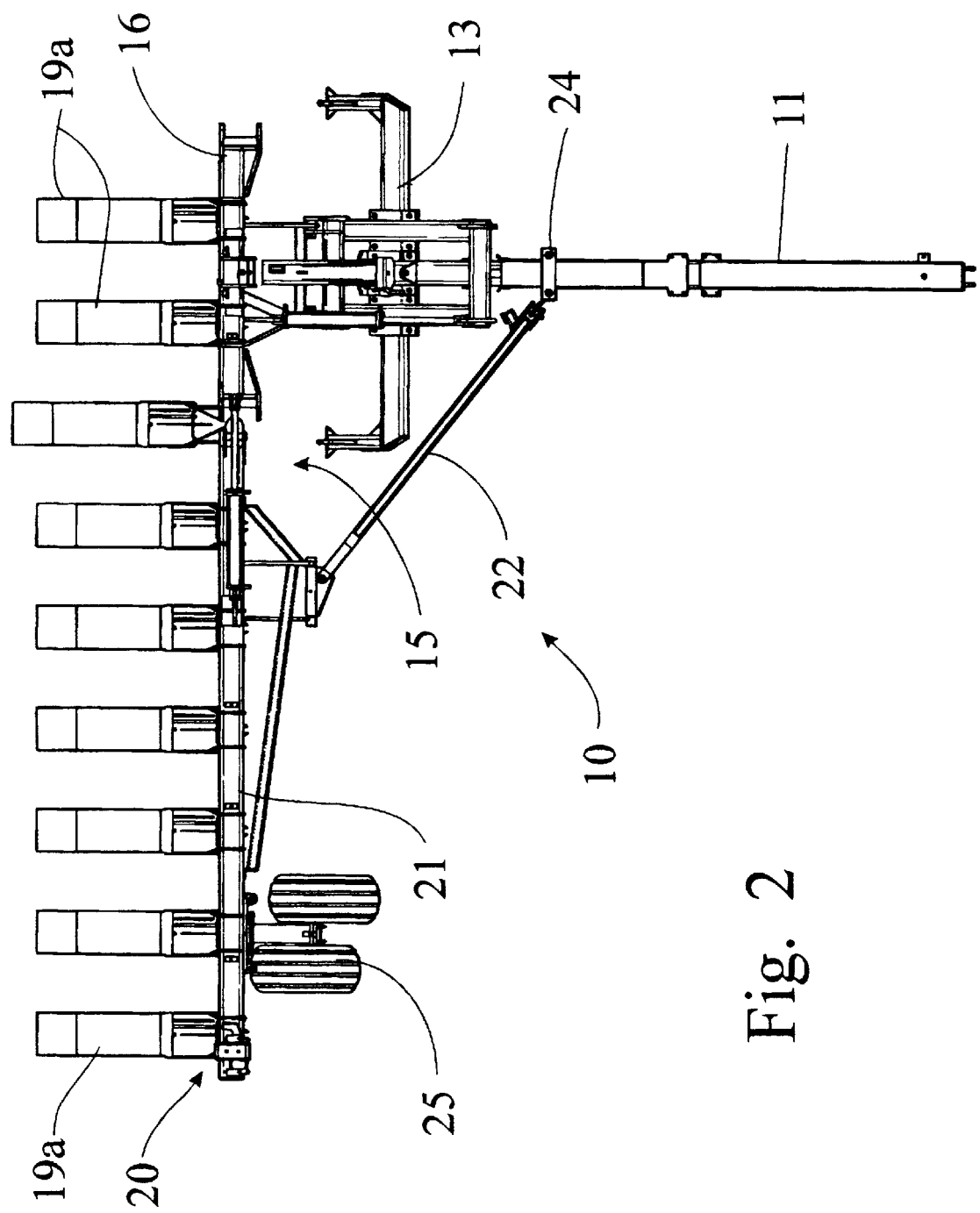
FIG. 2 is a top plan view of the portion of a 40 foot version of the planting implement similar to that depicted in FIG. 1, but without the lift assist mechanism, with a plurality of sub-frames mounted on the tool bar on which tillage and/or planting devices are mounted.
Figure 3:
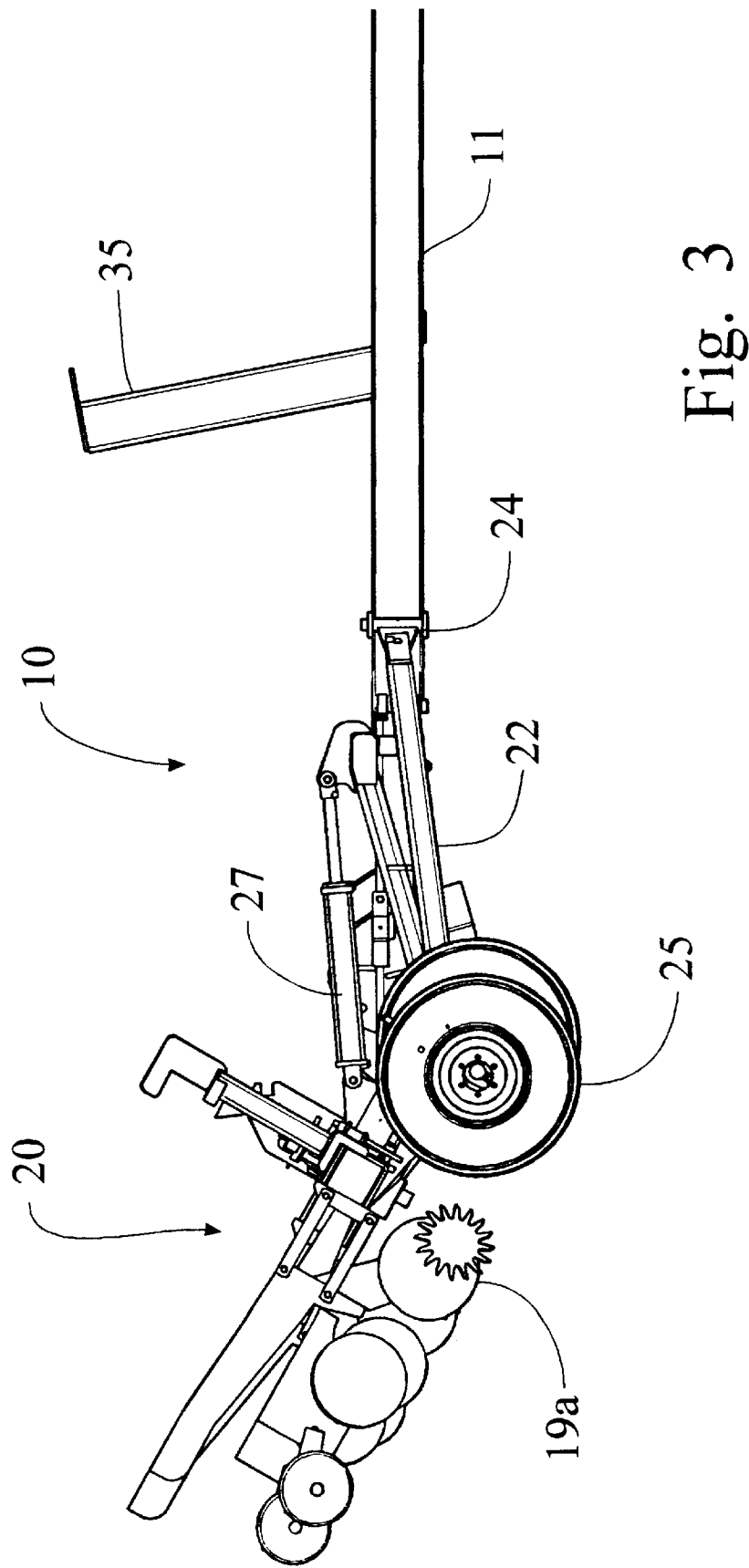
FIG. 3 is a partial side elevational view of the 40 foot version of the planting implement of FIG. 2 with the tool bar partially rotated, a representative tillage and/or planting device being depicted.
Figure 4:
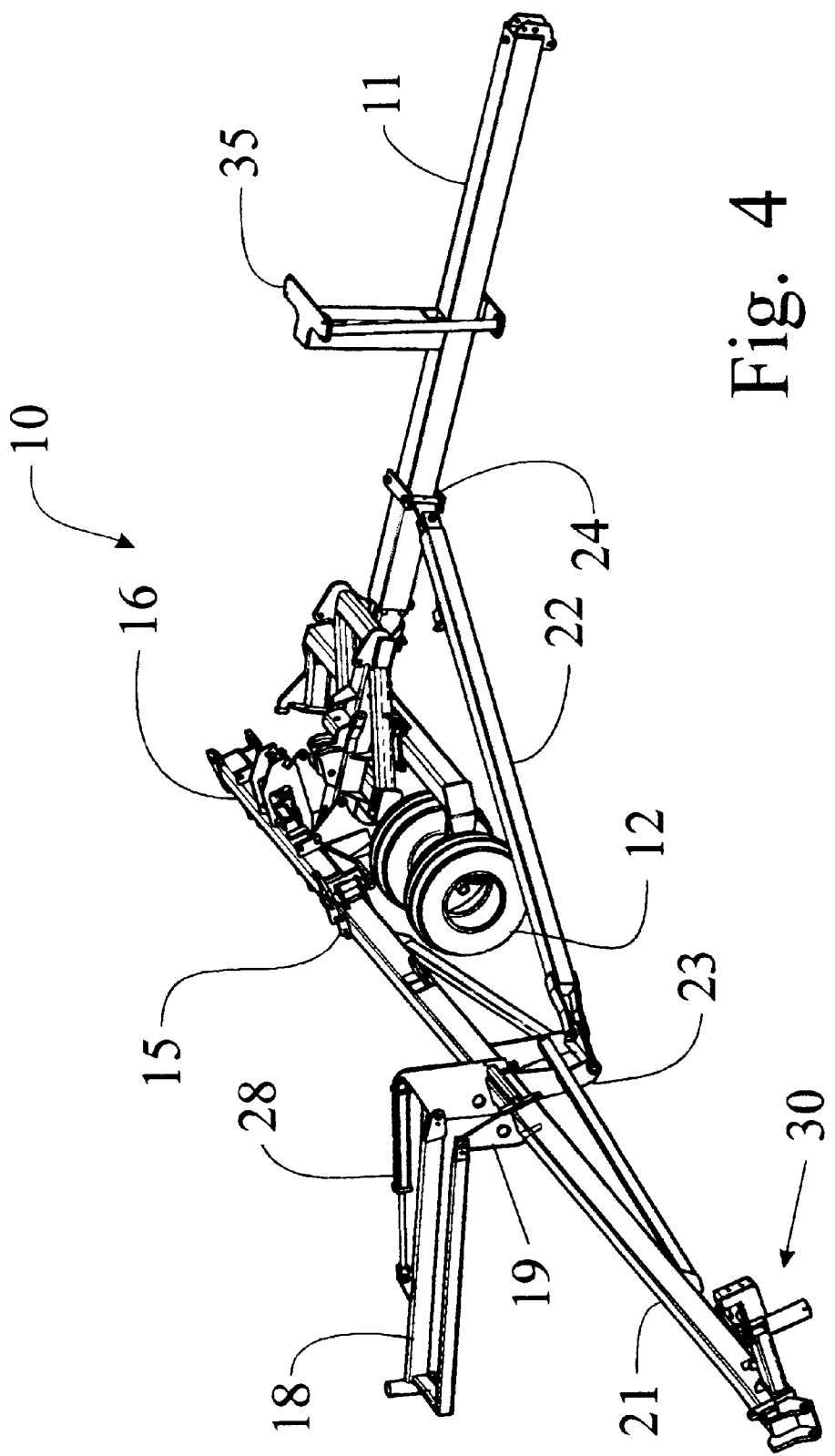
FIG. 4 is a schematic right side perspective view of the 60 foot version of the tool bar shown in FIG. 1 with the tool bar being partially rotated to initiate the conversion of the implement into the transport position.
Figure 5:
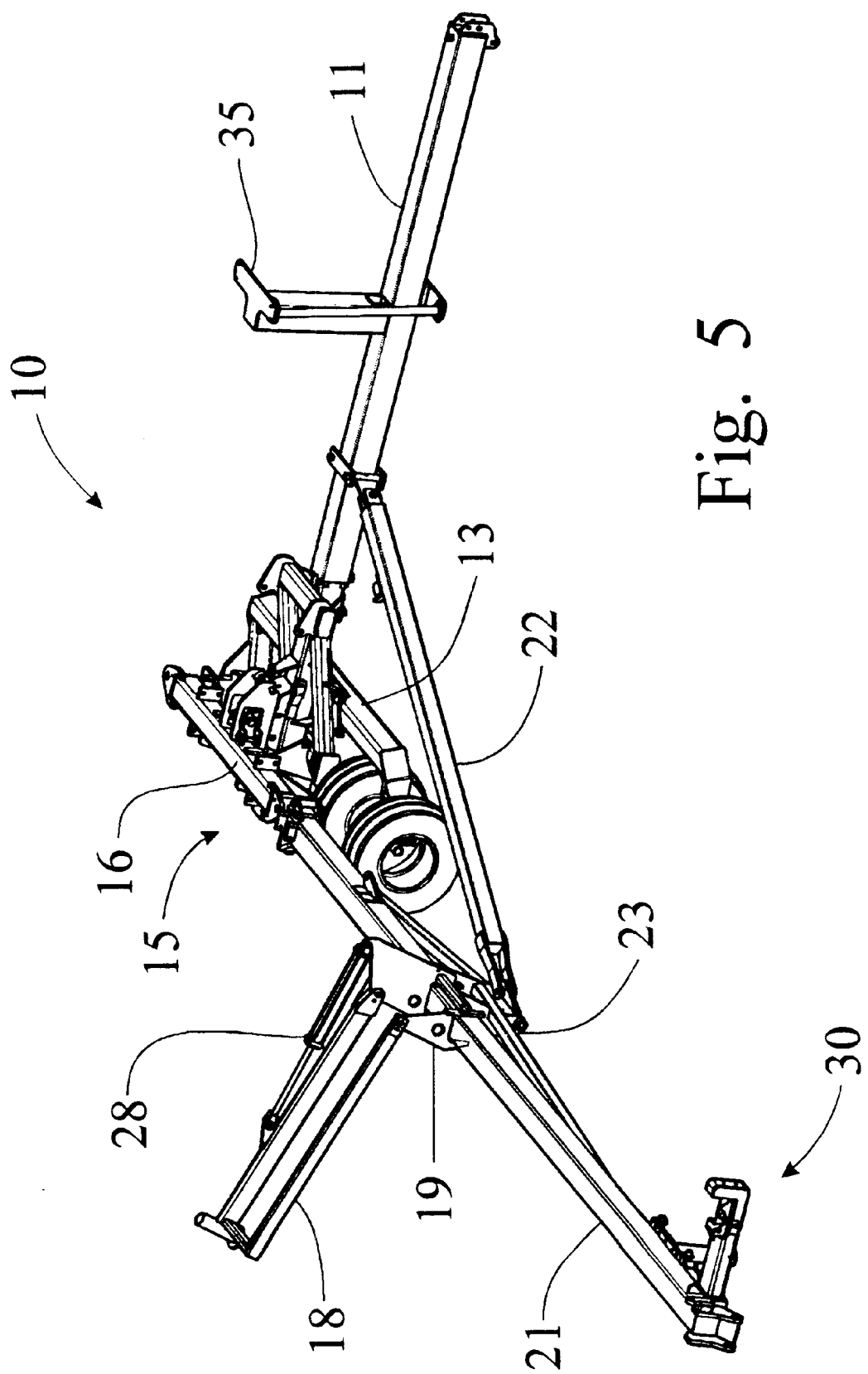
FIG. 5 is a schematic right side perspective view of the 60 foot version of the tool bar similar to that of FIG. 4, but with the tool bar completely rotated into an intermediate transport position.

Referring now to FIGS. 1 and 2, the planting implement 10 in the normal field operating configuration is depicted schematically. The draw bar 11 is oriented longitudinally for connection to the tractor (not shown) providing motive power. The tool bar 15 is rolled back into a rearward pivoted position from which the planting mechanisms 19a extend rearwardly to trail the tool bar 15. The left and right wing members 21 are transversely extended in a linear manner to the full operating width. A brace 22 interconnects the draw bar 11 and a bracket 23 projecting forwardly (in the normal operating configuration shown in FIG. 1) of the wing members 21. A transport lock mechanism 30 is mounted on the end of the wing member 21 and projects upwardly therefrom. The remote ends of the wing members 21 is supported by a caster wheel 25 that will be described in greater detail below.

Referring now to FIGS. 3–7, the beginning of the conversion of the planting implement from the normal operating configuration to a narrow transport configuration can best be seen, the 60 foot version of the implement 10 with the lift assist mechanism 18 being schematically depicted being shown in FIGS. 4–7. A hydraulic cylinder 27 (best seen in FIG. 16) interconnecting the draw bar 11 and the center section 16 of the tool bar 15 is actuated to cause the tool bar 15 to pivot forwardly about the pivot axis 14. All three sections of the tool bar 15, the center section 16 and the left and right wing members 21, rotate in unison. The lift assist mechanism helps support the distal ends of the wing members, as will be described in greater detail below.

Figure 8:
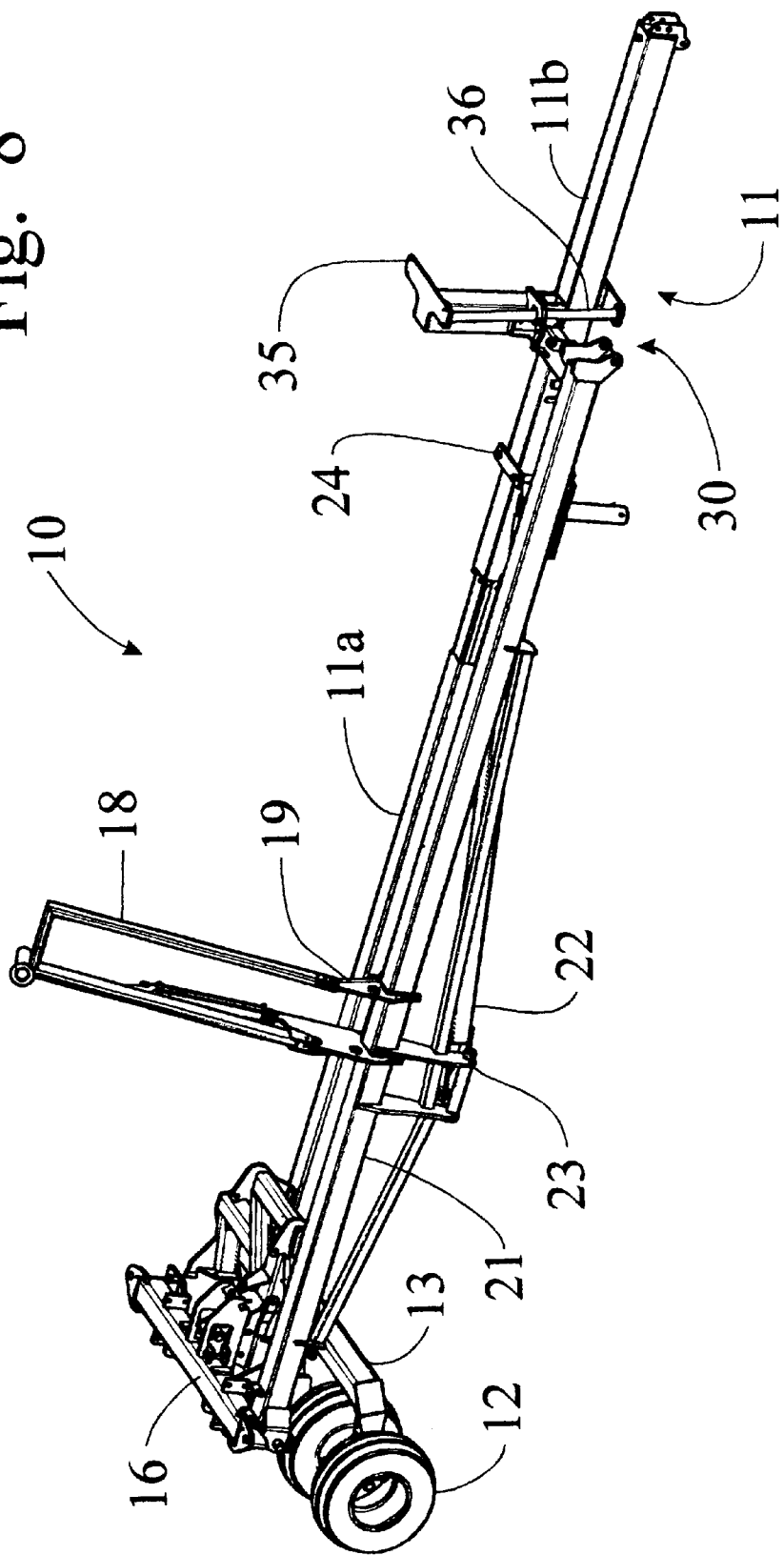
FIG. 8 is a schematic right side perspective view of the 60 foot version of the tool bar similar to that of FIGS. 1–3 with the representative right wing pivoted into the transport position and the wing member locked into the transport position by a locking mechanism mounted on the draw bar.

The bracket 23 rotates downwardly toward the ground as the tool bar rotates upwardly and forwardly, effecting a pivotal movement of the connected brace 22. The bracket 23 includes a generally horizontal joint that is positioned in general alignment with the pivot axis 14 about which the tool bar 15 pivots so that the elevation of the joint remains relatively constant as the bracket 23 is rotated with the tool bar 15. As a result, the brace 22 remains generally stationary during the transition of the tool bar from the field operating position shown in FIG. 6A to the intermediate transport position of FIG. 6D. The complete rotation of the tool bar 15 is best seen sequentially in FIGS. 6A–6D. The transport lock mechanism 30 is oriented forwardly for engagement with the draw bar 11, as will be described in greater detail below. Once the tool bar 15 is completely pivoted forwardly and the wing members 21 are folded forwardly, the lift assist cylinders 28 can be actuated to effect an upward pivotal movement of the lift assist mechanism 18 relative to their respective mounting brackets 19 to lift the support wheel 18a off the ground, as shown in FIG. 8.

Figure 6A:
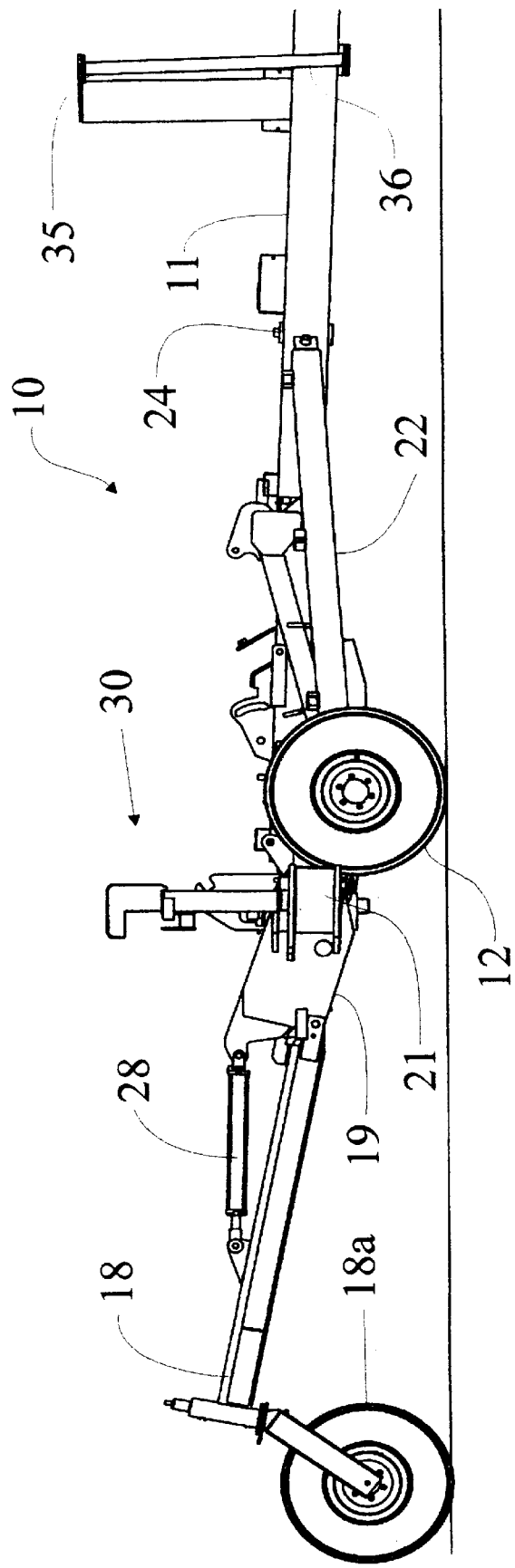
FIG. 6A is a side elevational view of the 60 foot version of the planting implement of FIGS. 4 and 5 in the field operating position, the lift assist mechanism being shown extending rearwardly of the tool bar.
Figure 6B:
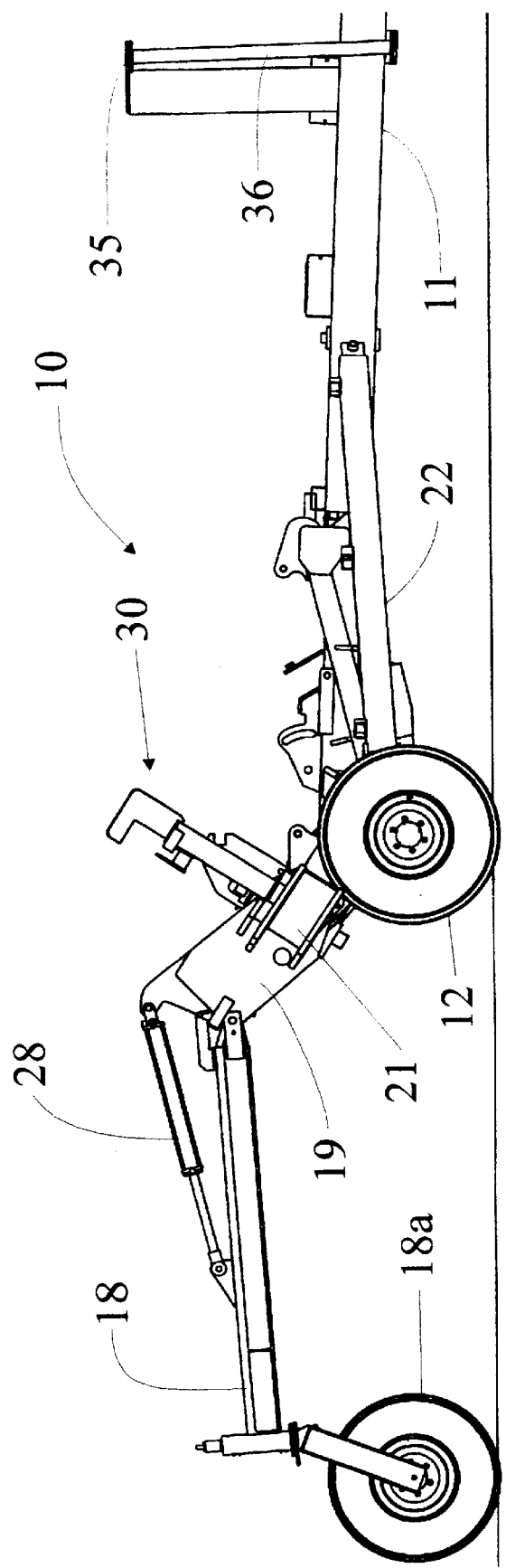
FIG. 6B is a side elevational view of the planting implement shown in FIG. 6A with the tool bar partially rotated to initiate the conversion of the implement from the operating configuration to the transport configuration, the lift assist mechanism supporting the lateral extremities of the wing members, the position of the tool bar also corresponds to the headland position for the planting implement.
Figure 6C:
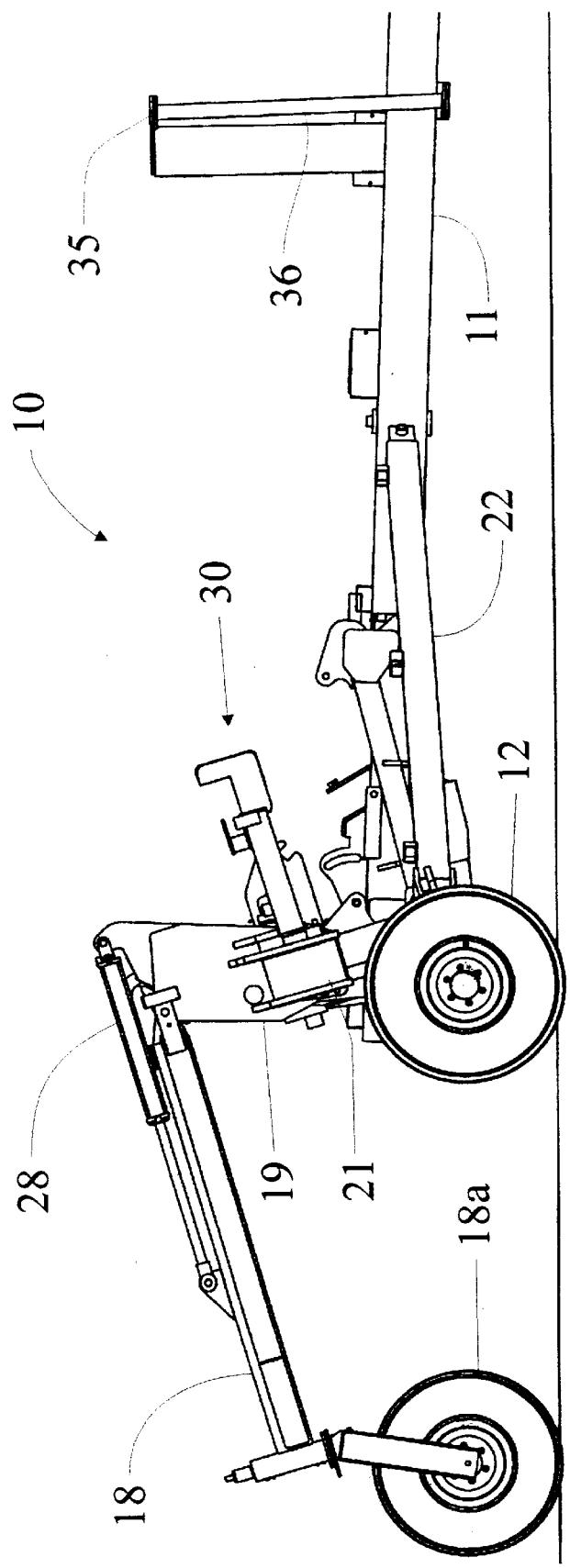
FIG. 6C is a side elevational view of the planting implement shown in FIGS. 6A–B with the tool bar rotated to a position where most of the weight of the tool bar is over the caster and fixed wheels of the tool bar, the lift assist mechanism still supporting the lateral extremities of the wing members.
Figure 6D:
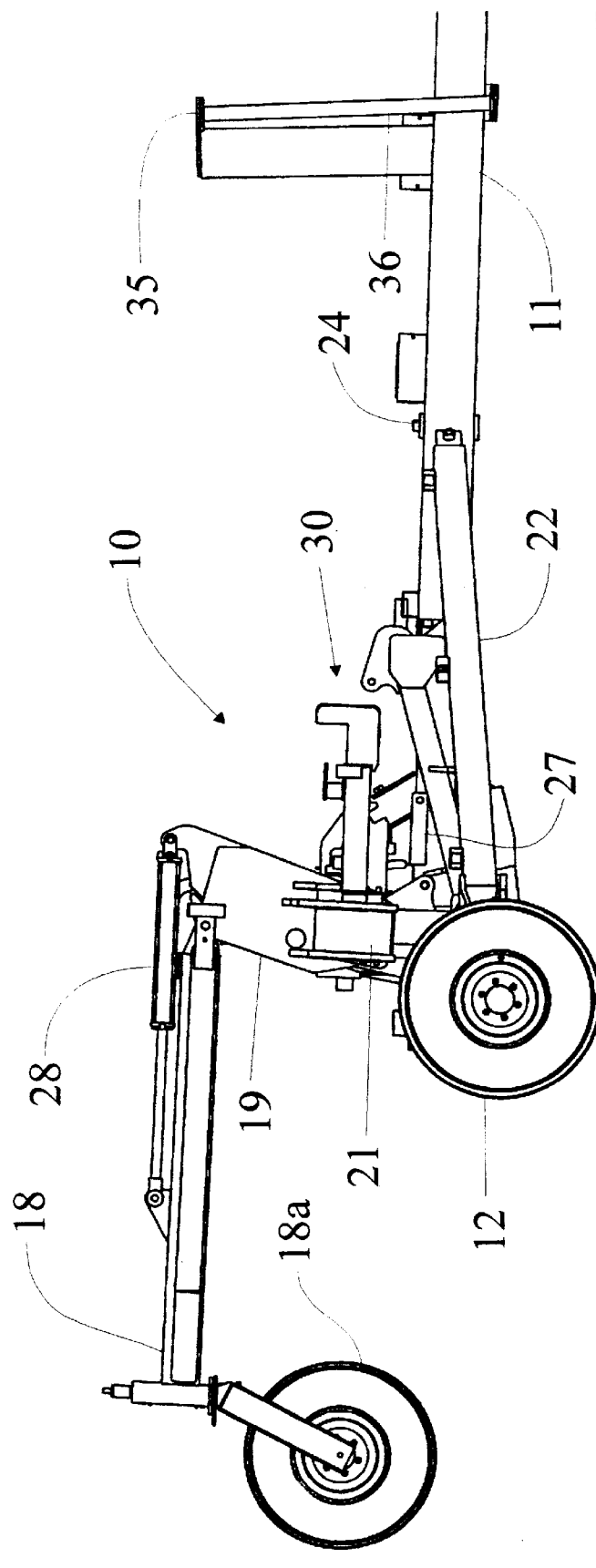
FIG. 6D is a side elevational view of the planting implement shown in FIGS. 6A–C with the tool bar fully rotated, the lift assist mechanism being lifted off the ground from the position depicted in FIG. 6C.
Figure 9:
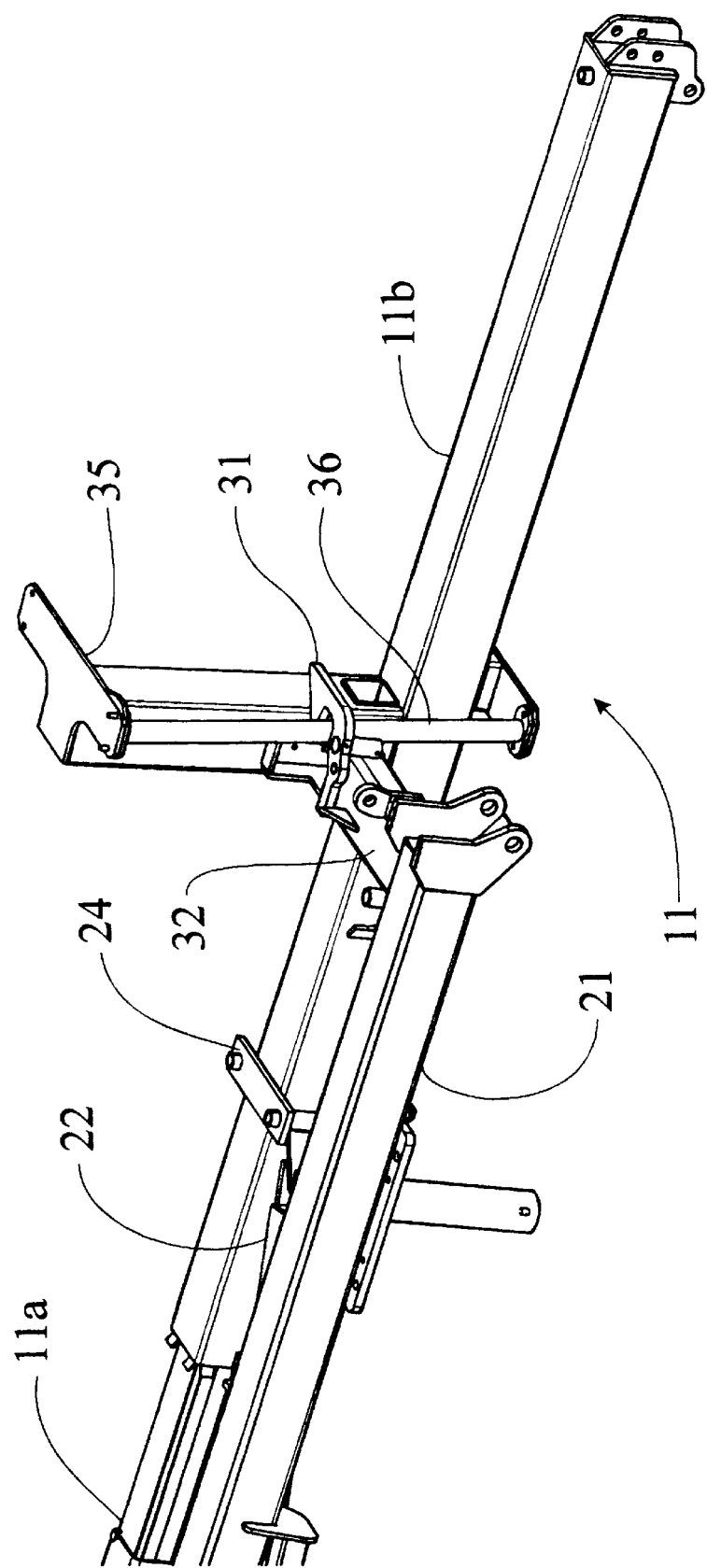
FIG. 9 is an enlarged right side perspective view of the forward end of the draw bar to depict the locking mechanism fixing the representative right wing member in the transport position.
Figure 17:
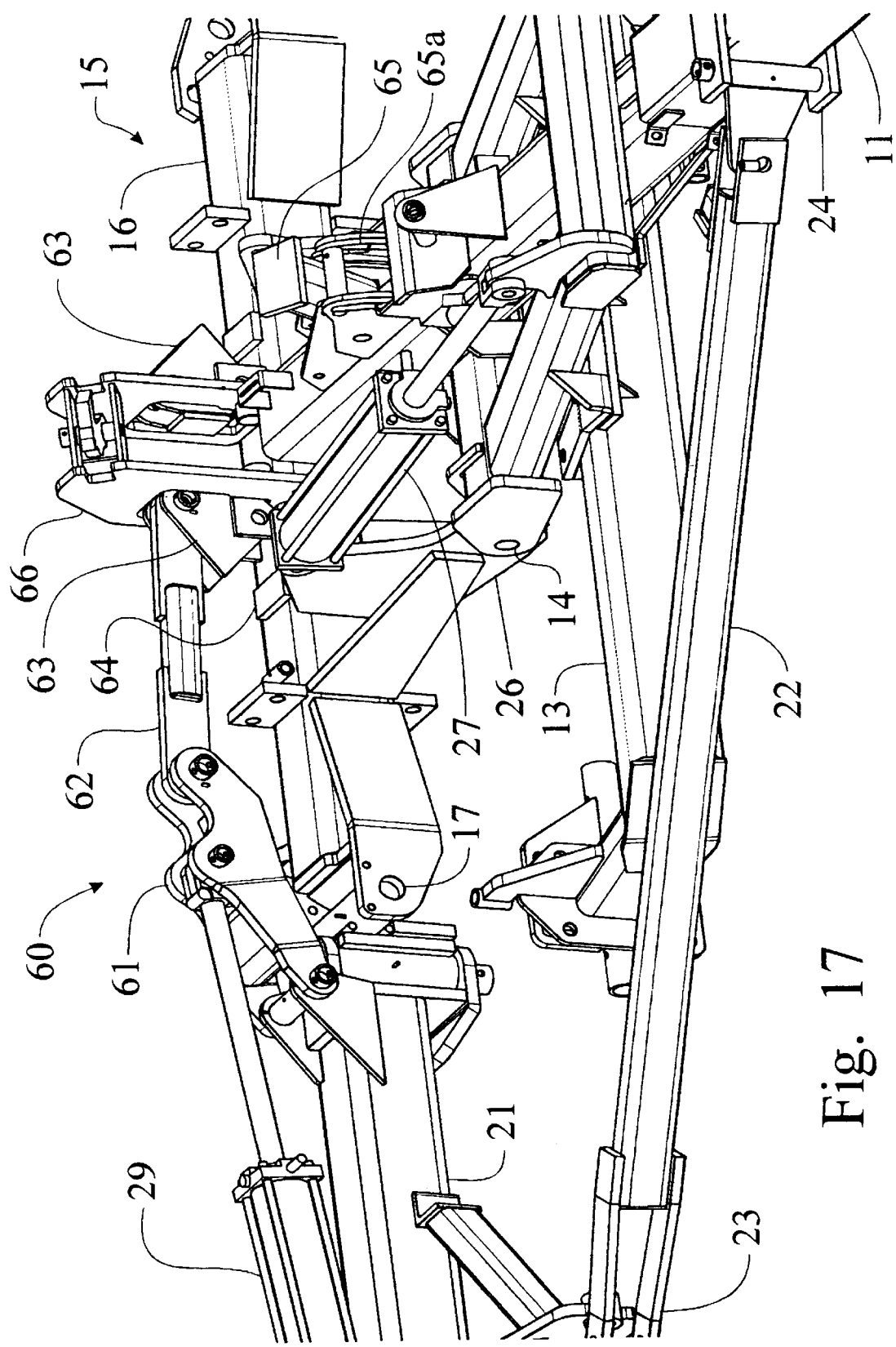
FIG. 17 is a right front perspective view of the intersection of the draw bar with the tool bar, similar to that of FIG. 16.
Figure 18:
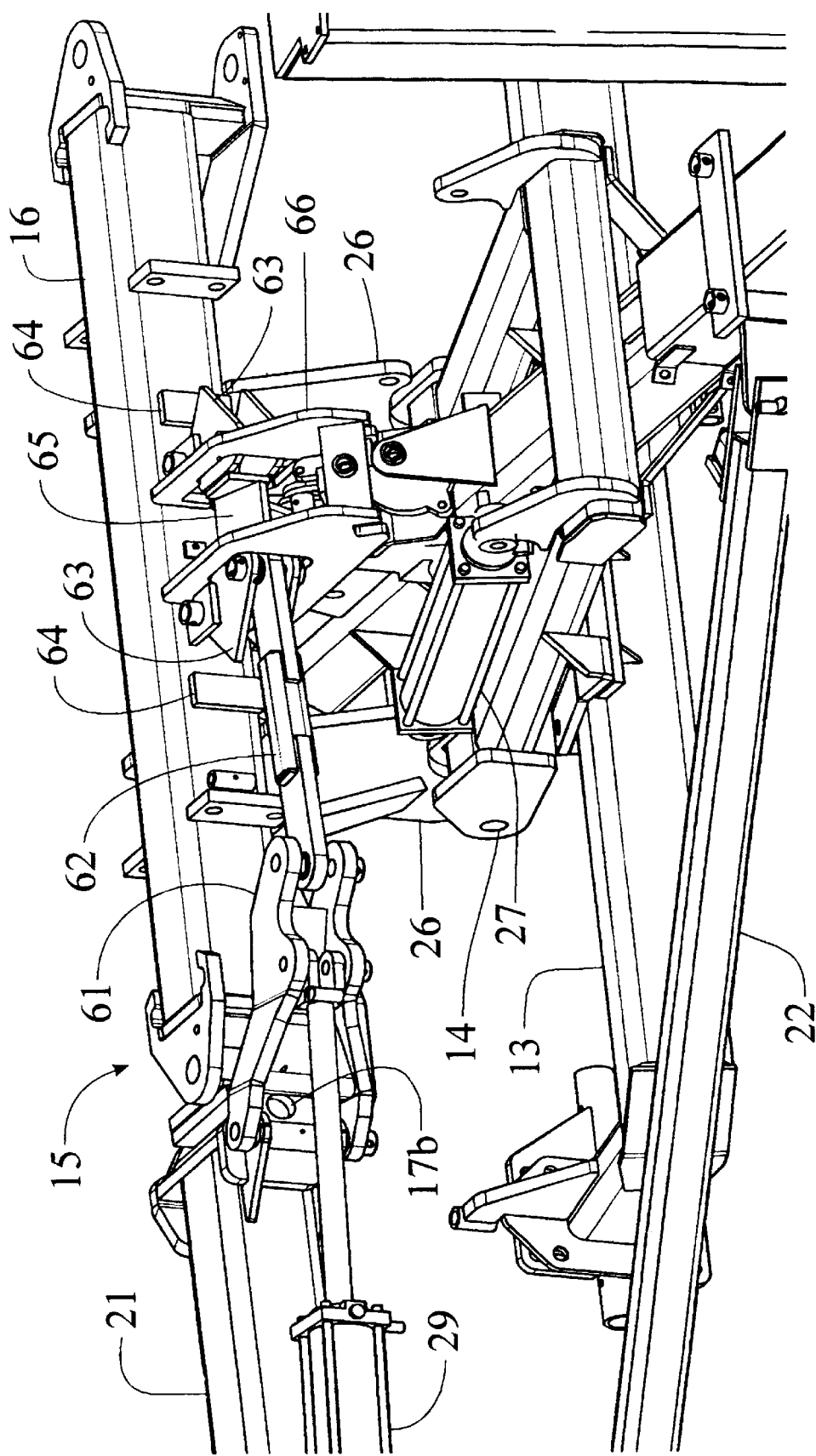
FIG. 18 is a right front perspective view of the intersection of the draw bar with the tool bar as shown in FIG. 17, but with the tool bar rotated to initiate the conversion of the implement from the operating configuration to the transport configuration.

With particular reference to FIGS. 17 and 18, one skilled in the art can see that the wing fold hydraulic cylinders 29 are positioned on top of the tool bar 15 when in the normal operating configuration, but are positioned in front of the tool bar 15 after the tool bar 15 has been fully pivoted forwardly to the position shown in FIGS. 6D, 7 and 18. Actuation of wing fold hydraulic cylinders 29, best seen in FIGS. 8 and 18, will then cause the wing members 21 to fold forwardly. As shown in FIGS. 8 and 9, the transport lock mechanism 30 will ultimately engage a latch retainer bar 36 mounted on the draw bar 11 to fix the wing member 21 in a transport position. The caster wheels 25 are released to pivot as necessary to finally orient parallel to the wing member 21 when in the transport position and remain castering to accommodate the turning of the implement 10 around turns, when in the transport position.

Figure 10:
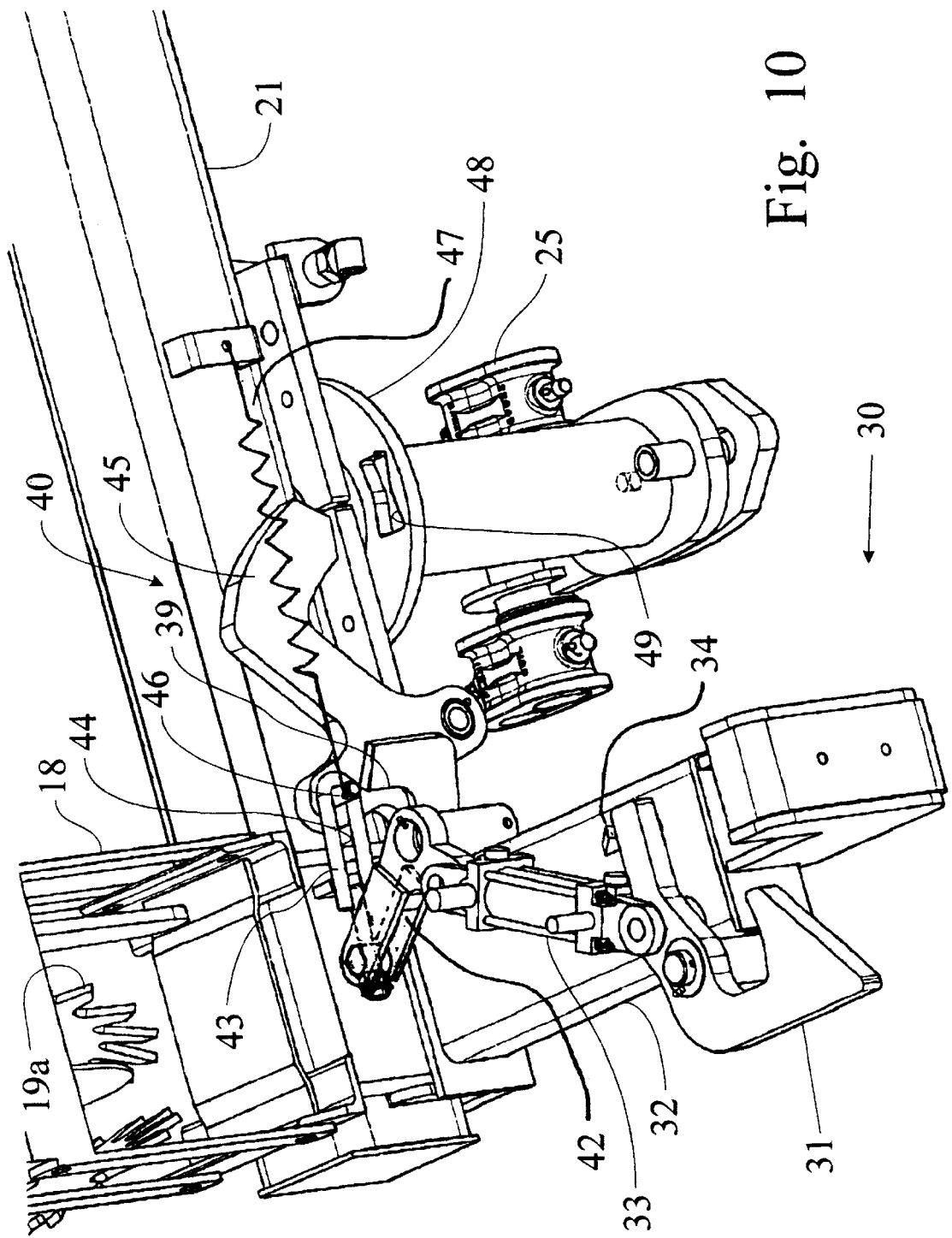
FIG. 10 is an enlarged front perspective view of the mechanism at the end of wing members providing a combined transport and caster lock.
Figure 11:
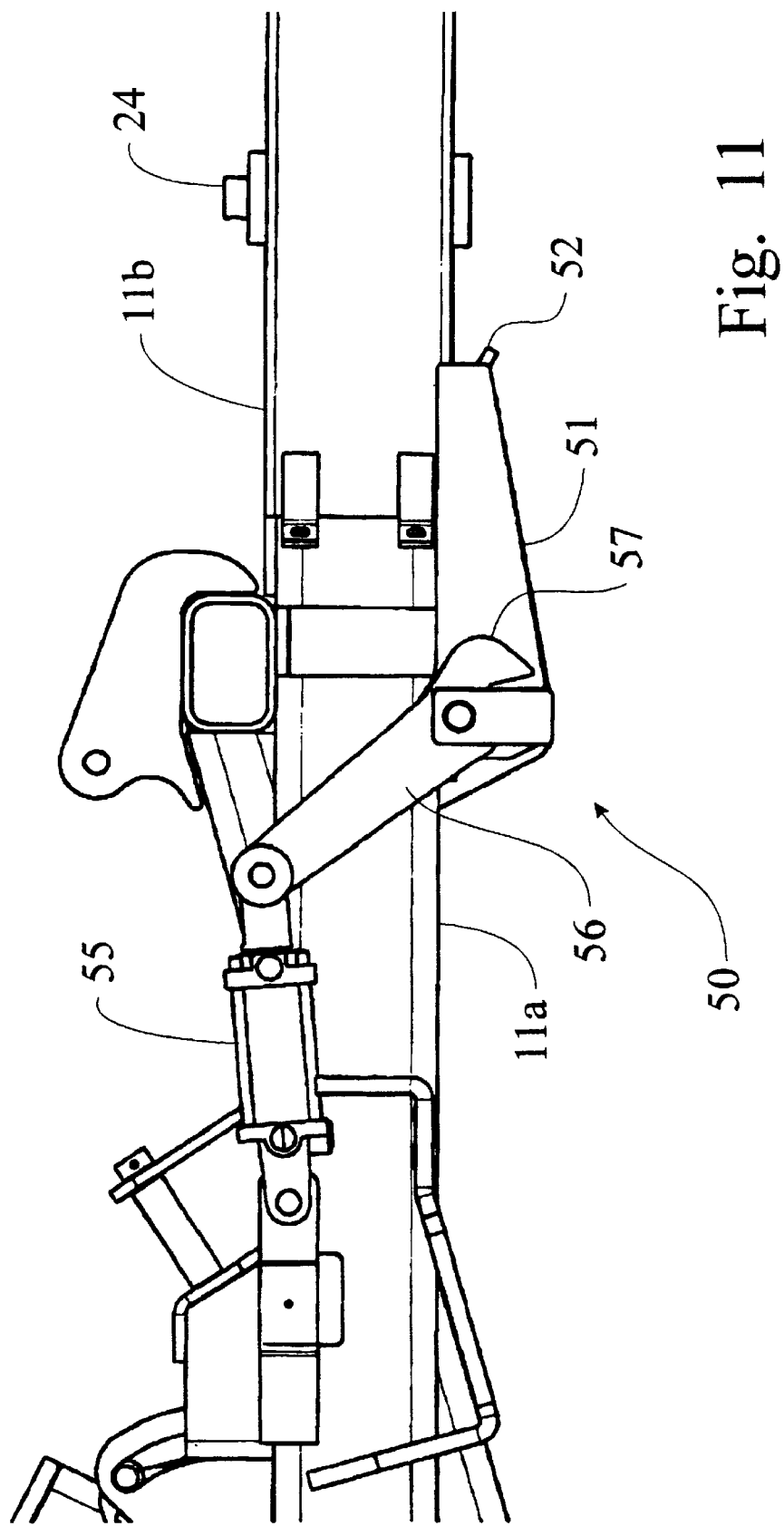
FIG. 11 is an enlarged right side elevational view of a portion of the draw bar of a planting implement incorporating a telescoping hitch latch mechanism.
Figure 12:
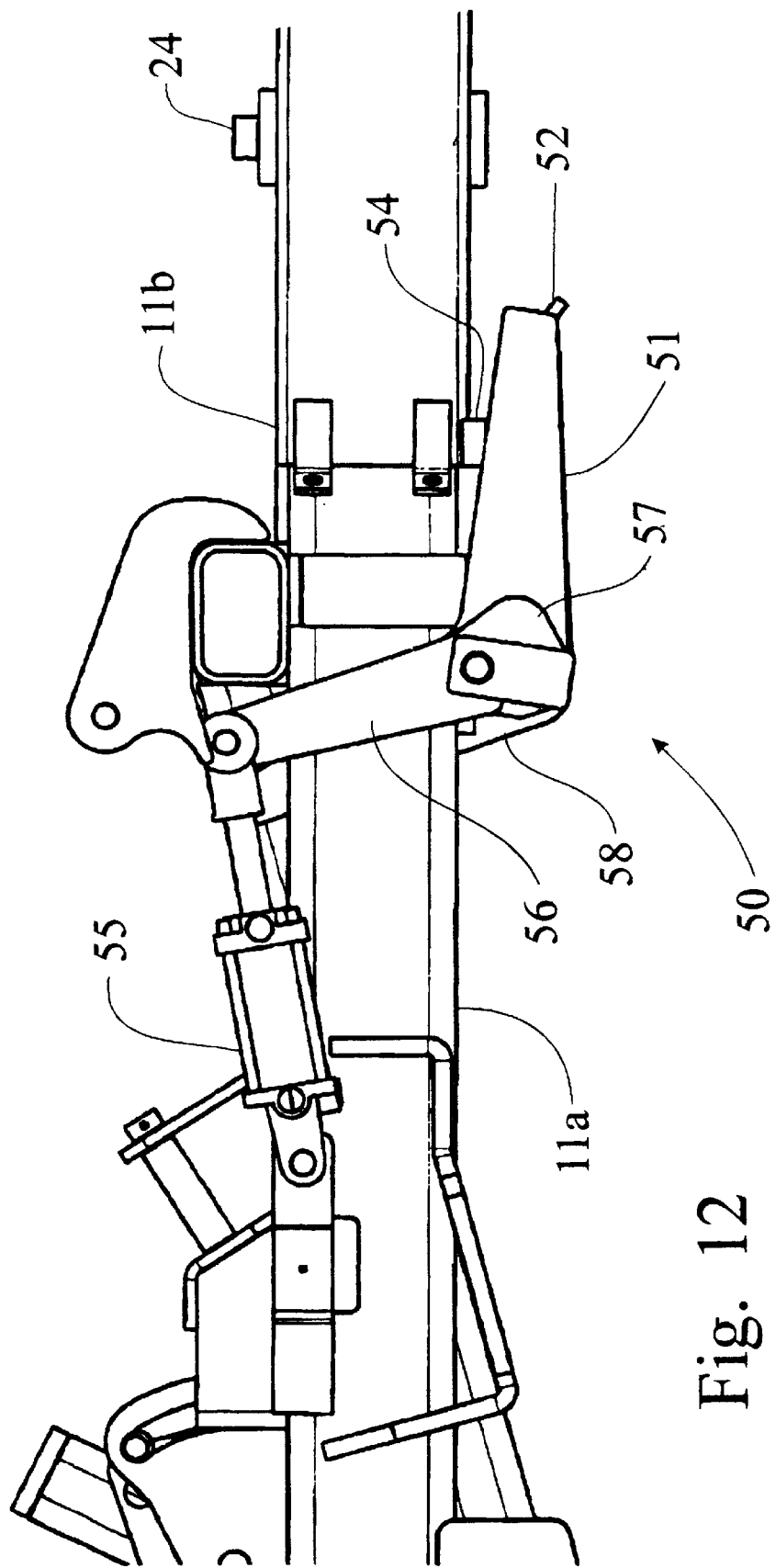
FIG. 12 is a right side elevational view of a portion of the draw bar similar to that of FIG. 11, but with the hitch latch moved to an open position.
Figure 13:
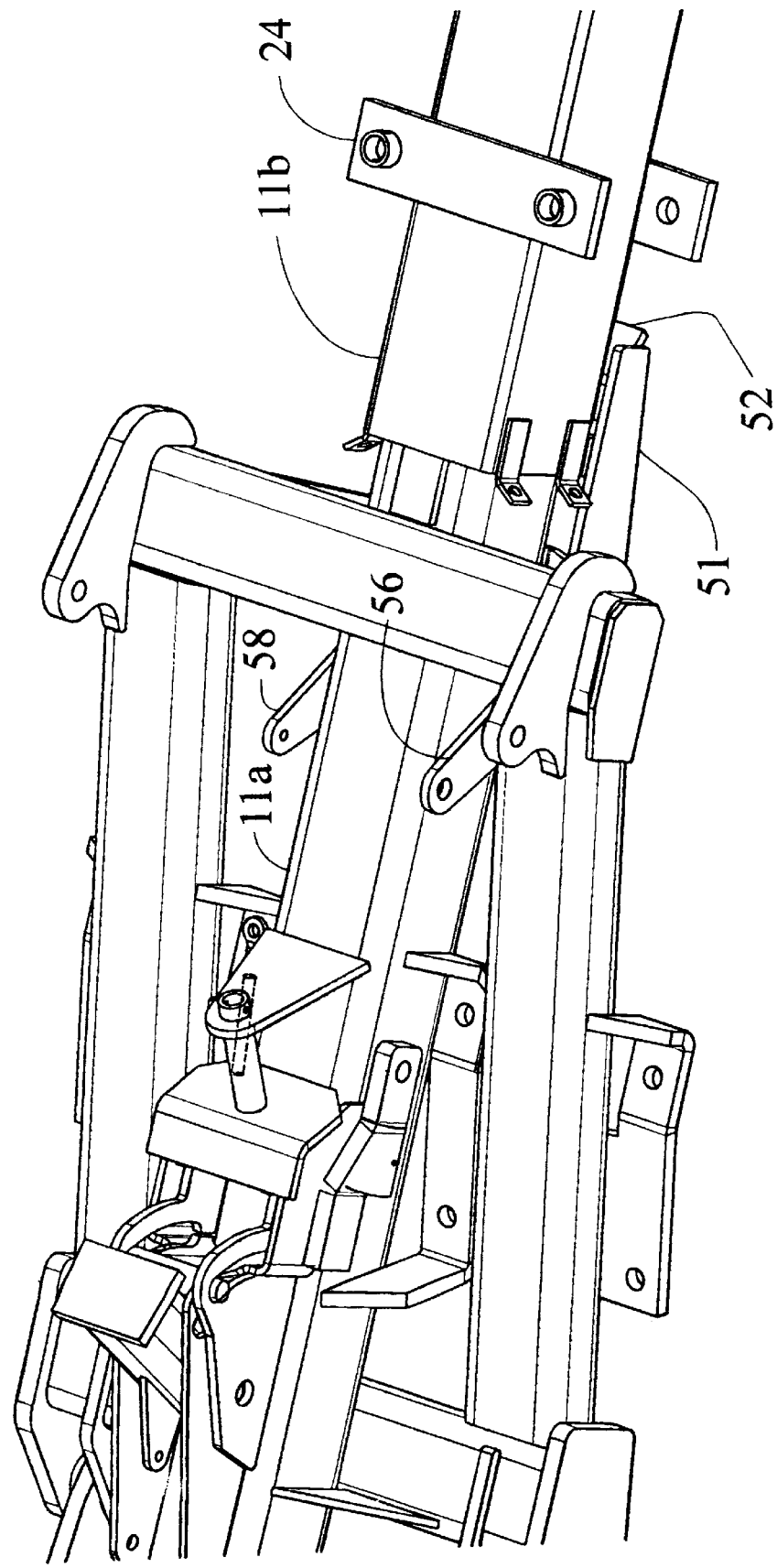
FIG. 13 is a partial, upper right perspective view of the hitch latch mechanism shown in FIGS. 11–12.
Figure 14:
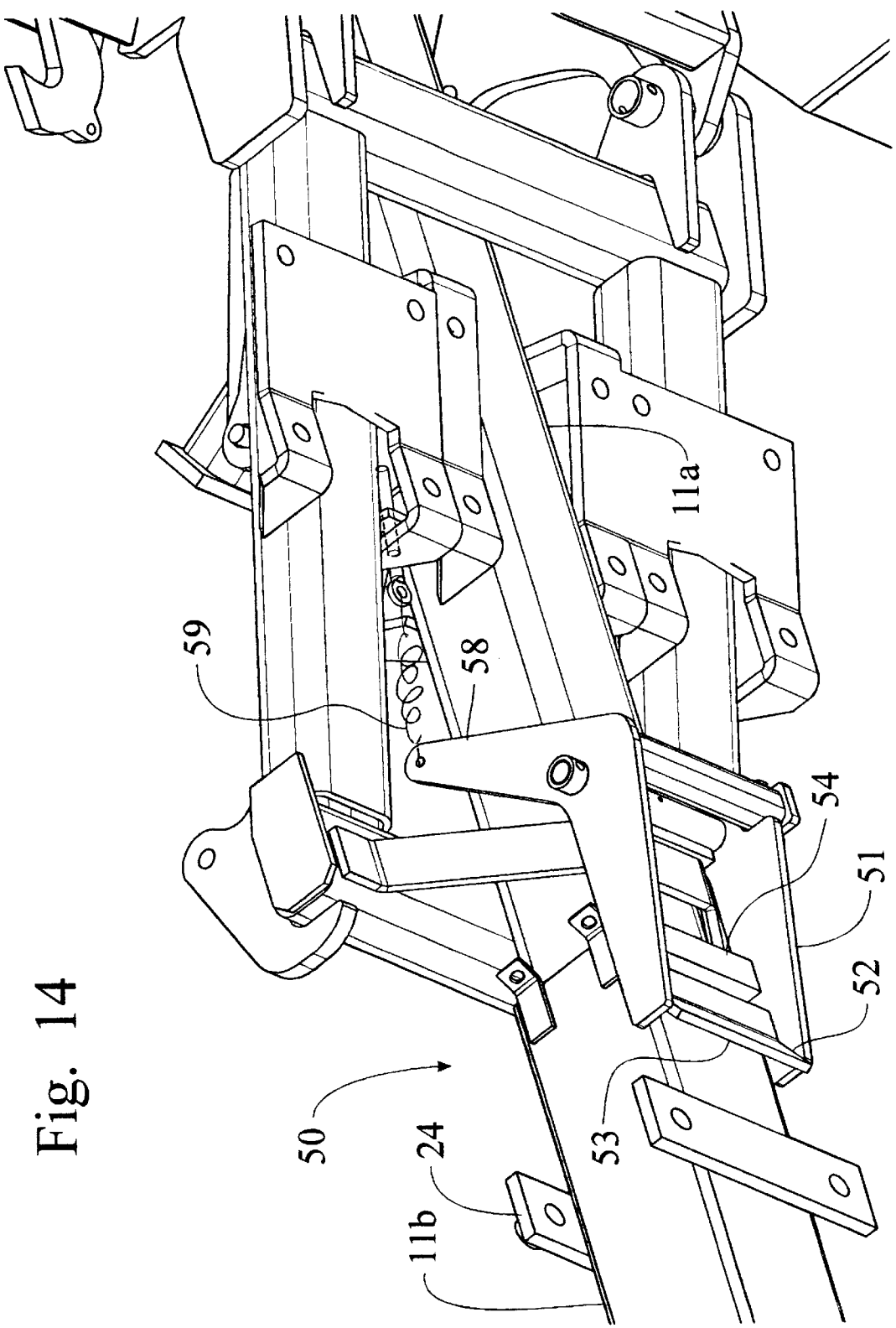
FIG. 14 is a partial, lower left perspective view of the hitch latch mechanism seen in FIG. 13.
Figure 15:
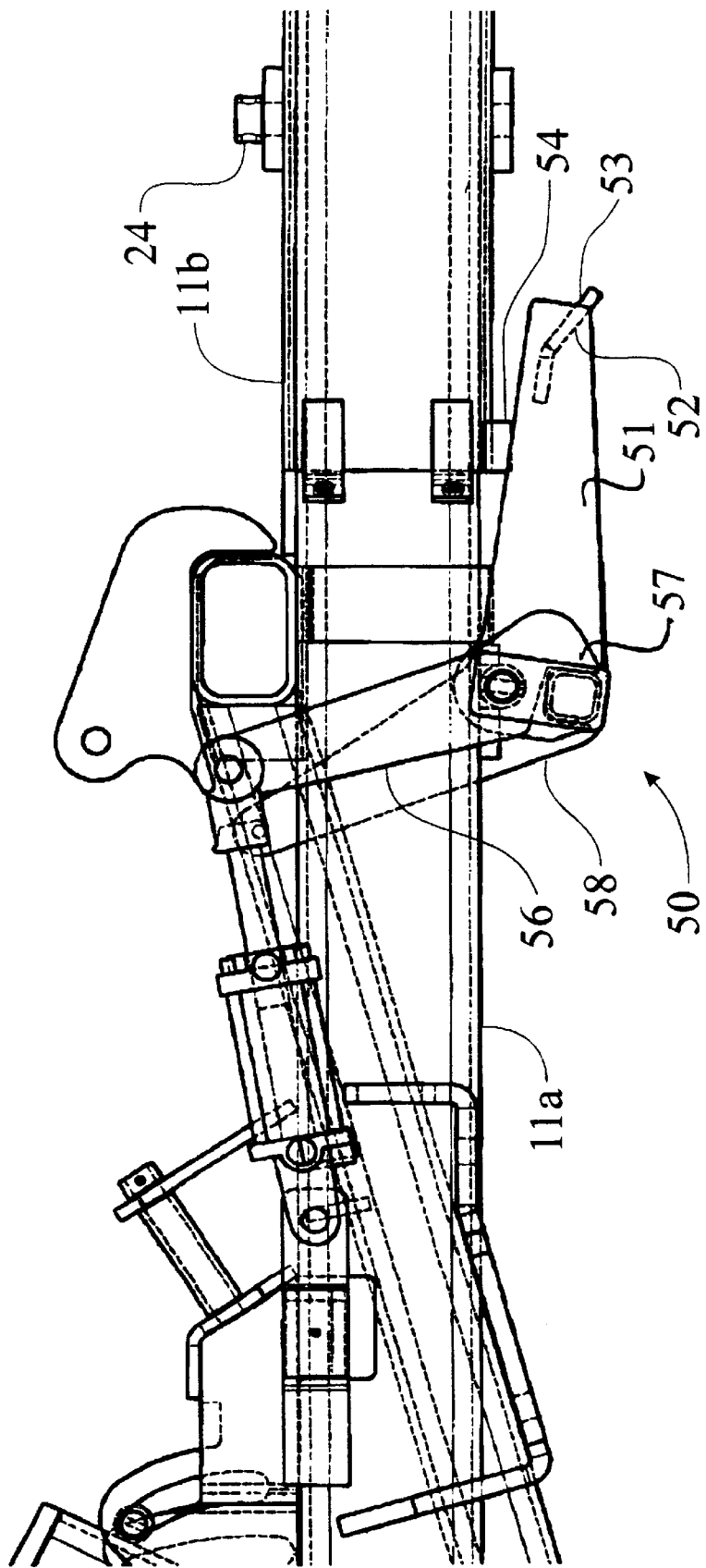
FIG. 15 is a right side elevational view similar to that of FIG. 12, but with phantom lines depicting the abutment and lost motion in the actuator crank.

With particular reference to FIGS. 9 and 10, one skilled in the art will see that the transport lock mechanism 30 includes a latching hook 31 pivotally mounted on a support bar 32. A wing latch hydraulic cylinder 33 controls the pivotal movement of the latch hook 31. A first abutment 34 fixed to the support bar 32 limits the pivotal movement of the latch hook 31 in a closed direction. The latch retainer bar 36 is part of a latch tower 35 mounted in a vertical orientation on the draw bar 11 for proper engagement with the latch hook 31 when the wing member 21 is pivoted into the transport position. Simply, the wing latch actuator (hydraulic cylinder) 33 is pivoted into a closed position against the first abutment 34 to capture the latch retainer bar 36 when the wing member 21 is moved into the transport position. The specific configuration of the latch tower 35 with the generally vertically oriented retainer bars 36 allows the folded wing assemblies 20 to float vertically to move over ground undulations about the now horizontal wing pivot axis 17b while remaining latched in the transport position.

The wing latch hydraulic cylinder 33 also actuates a caster lock mechanism 40 that controls the castering movement of the caster wheels 25. When in the normal operating position, the caster wheels 25 need to be locked into a forward direction to keep the left and right wing assemblies 20 in a proper working orientation. The axis which allows the assembly to caster when in the transport position, is horizontal in the field working position and needs to be locked to stabilize the wheel assembly in the field position. When the wing assemblies 20 are in the transport position, the caster wheels 25 are still in a forward direction, but are turned approximately 90 degrees relative to the wing member 21 as compared to the operating position. To make this pivoting movement relative to the wing member 21, the caster wheels 25 must be unlocked to permit them to caster.

The caster lock mechanism 40 includes a crank 42 pivotally mounted on the support bar 32 and connected to the wing latch hydraulic cylinder 33 at one end and to a lost motion link 43 at the other end. A caster lock hook 45 is pivotally mounted on the wing member 21 and has a pin 46 projecting outwardly therefrom for engagement with the slot 44 in the lost motion link 43. A spring 47 is anchored on the wing member 21 and connected to the pin 46 on the caster lock hook 45 to bias the pivotal movement of the caster lock hook 45 toward engagement with an opening 49 appropriately placed on an otherwise solid disk 48 on the caster wheel 25. As is described in greater detail below, the spring 47 is also effective to bias the wing latch hook 31 into a closed position when the wing latch actuator 33 is fully retracted to form a solid link between the wing latch hook 31 and the crank 42. The crank 42 is also engageable with a second abutment 39 that keeps the wing latch hook in an open position when the wing latch actuator 33 is fully extended.

In operation, the caster lock mechanism 40 keeps the caster wheel locked in a forward directing orientation when the planting implement 10 is in a normal operating configuration by keeping the caster lock hook 45 engaged with the opening 49 in the caster disk 48. The biasing spring 47 urges the caster lock hook 45 into the locking engagement with the disk 48. When the wing latch actuator 33 draws the latch hook 31 back against the first abutment 34, the wing latch hydraulic cylinder 33 continues its retraction stroke by pulling on the crank 42, which, in turn, pulls the lost motion link 43 away from the caster lock hook 45 bottoming out the pin 46 in the slot 44. The continued pulling of the lost motion link 43 overcomes the biasing force exerted by the spring 47 to withdraw the caster lock hook 45 out of the opening 49 in the disk 48, thereby freeing the caster wheel 25.

Upon the return of the planting implement 10 to the operating configuration, the wing latch actuator 33 extends to rotate the crank 42 and push the lost motion link 43 toward the caster lock hook 45. The biasing spring 47 pulls the caster lock hook into engagement with the caster disk 48 which will ride on top of the disk 48 until the caster wheel 25 rotates into the proper position for the opening 49 to align with the hook 45. The pin 46 is free to ride in the slot 44, while the hook 45 is riding on top of the disk 48, as the lost motion link 43 is pushed by the actuator 33 to a position corresponding to full engagement of the hook 45 into the opening 49.

Referring now to FIGS. 11–15, the details of the hitch latching mechanism 50 can best be seen. The draw bar 11 is telescopic to enhance the operating and transport capabilities of the planting implement. With an air cart (not shown) mounted to the rear of the planting implement 10 as is commonly done to provide a supply of seed and fertilizer to the planting devices 19a, better tracking can be attained for the implement 10 by shortening the draw bar 11 when in the operating configuration, as the implement 10 better follows the tractor, particularly in tight turns, when the hitch is shortened. Accordingly, the draw bar 11 is designed to telescope to a longer length when in the transport configuration to accommodate the forward folding of the wings 21. The hitch latching mechanism 50 controls the telescopic action of the draw bar 11. A lower latch member 51 is pivotally supported on the rear portion 11a of the draw bar and has a latching tab 52 that is engageable with a transverse bar-like stop member 54 fixed to the forward portion 11b of the draw bar. When pivoted into engagement with the stop member 54, the latching tab 52 prevents the forward portion 11b of the draw bar from extending forwardly relative to the rearward portion 11a.

The lower latch member 51 is controlled in operation by a actuation lever 56 pivotally mounted on the right side of the draw bar 11 on the same pivot axis as the lower latch member 51 and connected to a hydraulic actuator 55 pinned to the rearward portion 11a of the draw bar. The actuation lever 56 has a crank portion 57 that is engageable with the lower latch member 51 to cause the lower latch member 51 to pivot downwardly away from engagement with the stop member 54. The crank portion 57 is configured so as to require a predetermined amount of rotation before causing pivotal rotation of the lower latch member 51 for reasons that will become apparent below. The left side of the lower latch member 51 extends upwardly as a spring arm 58 that is connected to a biasing spring 59 anchored on the draw bar 11 rearwardly of the lower latch member 51. The biasing spring 59 urges the lower latch member 51 into upward pivotal movement that causes engagement with the draw bar 11 and the stop member 54 mounted thereon. Each brace 22 is pivotally connected to the forward portion 11b of the draw bar by bracket 24.

The fold sequence includes the appropriate lengthening actuation of the hitch lock actuator 55 to pivot the actuation lever 56 into engagement with the lower latch member 51, causing the lower latch member 51 to pivot downwardly out of engagement with the stop member 54. The wing members 21 are then folded forwardly to bring the latch hook 31 of the transport lock mechanism 30 into engagement of the retainer bar 36 on the latch tower 35. This forward folding movement pushes the brace 22 forwardly against the bracket 24 and, thereby, pushes the forward portion 11b of the draw bar forwardly relative to the rearward portion 11a and, as a result, lengthening the draw bar 11. Once the wing assemblies 20 have been latched into a transport position, the hitch actuator 55 can retract to allow the lower latch member 51 to be urged back into engagement with the forward portion 11b of the draw bar, so as to be ready to lock the draw bar 11 in the shortened configuration when the wing members 21 are to be unfolded. The latching tab 52 is formed with a cam surface 53 that is positioned in alignment with the stop member 54.

Unfolding the wing assemblies 20 back into their operating position will draw the braces 22 rearward to provide their respective support of the wing assemblies 20. As the braces move rearwardly, the forward portion 11b of the draw bar also retracts rearwardly causing the stop member 54 to engage, ultimately, the cam portion 53 of the lower latch member 51. The stop member 54 will effectively cause the cam portion 53 of the lower latch member 51 to move downwardly to allow the passage of the stop member 54 rearwardly thereof, after which the lower latch member 51 re-engages the lower stop member 54 fixing the position of the draw bar 51 for the operating configuration. The lost motion feature of the actuation lever 56 allows the lower latch member 51 to deflect downwardly for the passage of the stop member 54, while the biasing spring 59 urges the upward pivotal movement of the lower latch member 51.

Figure 16:
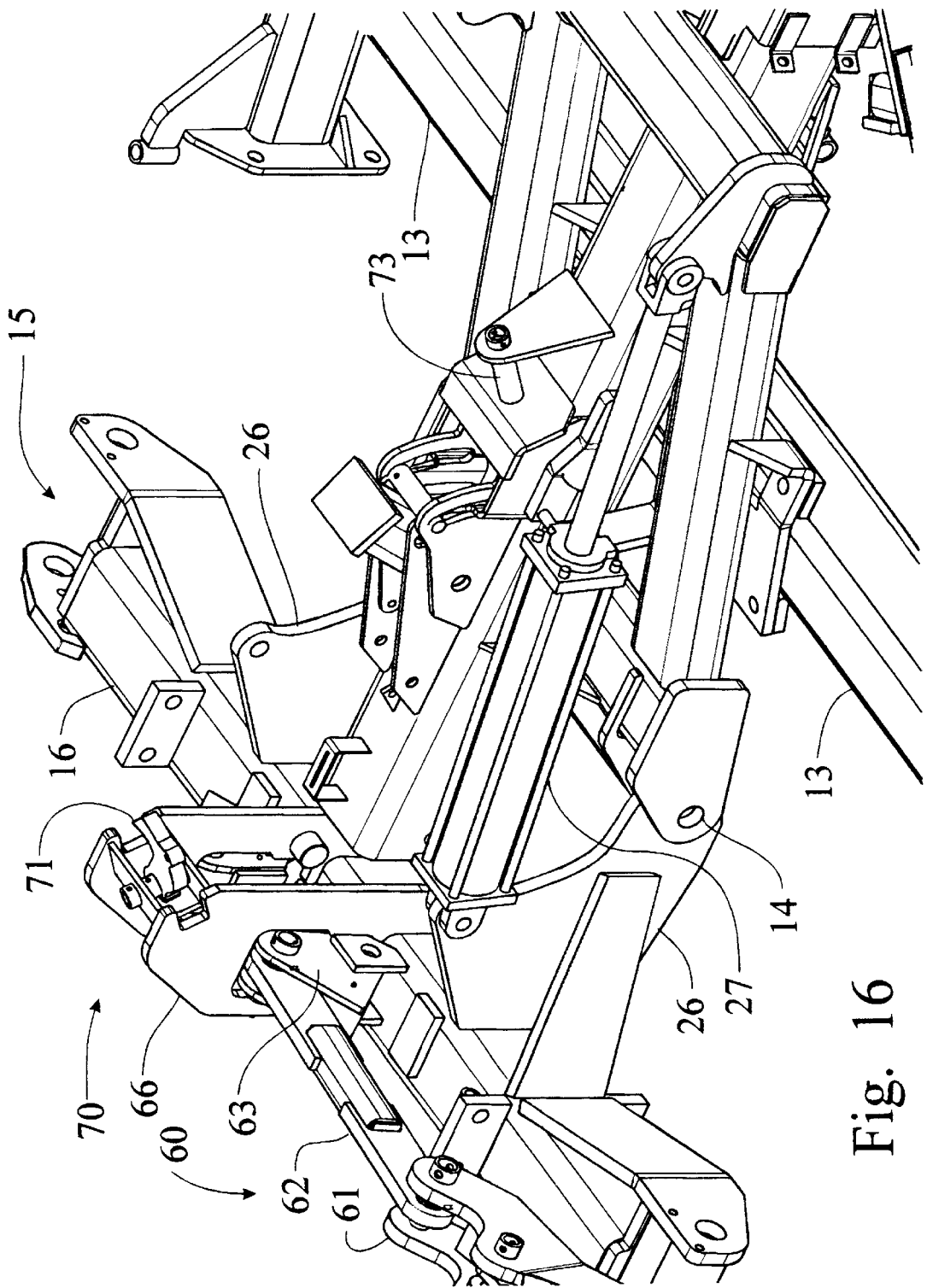
FIG. 16 is an enlarged right side perspective view of the intersection of the draw bar with the tool bar of the planting implement shown in FIG. 1 with the tool bar being in an operative position.

Referring now to FIGS. 16–18, the details of the mechanism for effecting the pivotal rolling of the tool bar 15 can best be seen. The tool bar 15 is pivotally connected to the draw bar 11 by a transverse pivot axis 14. A pair of hydraulic cylinders 27, one positioned on either side of the draw bar 11, control the pivotal movement of the tool bar 15 about the pivot axis 14. The hydraulic cylinders 27 are connected to the draw bar 11 support structure forming part of the transverse frame 13 and to corresponding fold cranks 26 fixed to the tool bar 15. When contracted, the hydraulic cylinders 27 pivot the fold cranks 26 and the attached tool bar 15 forwardly about the pivot axis 14, which is the initiation of the fold sequence. One skilled in the art will recognize that this forward pivoting of the tool bar 15 is also the action taken to raise the planters off the ground at the headlands of the field, which will be described in greater detail below. When extended, the hydraulic cylinders 27 roll the tool bar 15 rearwardly into the operating position. In this operating position, the tool bars 15 need to have the capability to float vertically with changing ground undulations by pivoting about the wing pivot axis 17. Setting the wing fold cylinders 29 to a float setting would provide float capabilities, but such action requires positive operator input which cannot be relied upon.

Each wing fold cylinder 29 is anchored on the corresponding wing member 21 and connected at the opposing end to a wing fold crank assembly 60 including a first crank link 61 pivotally mounted on the wing member 21 and being pivotally connected at the inboard end thereof to a second link member 62 positioned above the center section 16 of the tool bar 15. Each second link member 62 is pivotally connected to a third link support member 63 which in turn is pivotally mounted on the center section 16. The third link support member 63 is formed and mounted to be able to rotate through an arc of approximately 45 degrees from a outboard position in which the third link support member 63 is abutted against a first abutment 64 on the center section 16 to an inboard position passing through an opening in a support tower 66. When the planting implement 10 is in the operating position, the wing member 21 is movable through a range of vertical movement about the wing pivot axis 17 corresponding to the range of pivotal movement of the third link support member 63 which is not effective to stop the floating movement of the wing assemblies 20 until the pivotal movement of the third link support member 63 bottoms out on the first abutment 64 or interferes with the opposing third link support member 63.

During the unfold sequence of operation, the wing fold hydraulic cylinders 29 require a support against which to push in order to effect the movement of the wing member 21 relative to the center section 16. To accomplish this positive support of the wing fold hydraulic cylinders 29 during the unfold sequence, while permitting a range of floating movement to the wing assemblies 20 when in the operating configuration, an unfold finger 65 was provided. The unfold finger 65 is mounted on the rear draw bar 11a to be positionable to fit within the support tower 66 such that the unfold finger 65 can fit between the opposing third link support members 63 during the unfold sequence. The unfold finger 65 is biased toward a rearward most position defined by the lost motion links 65a to yield with the forwardly folding tool bar 15 and support tower 66. The unfold finger 65 provides a removable abutment lodging between the third link support members 63 during the fold and unfold sequences against which both hydraulic wing fold cylinders 29 can push to extend and unfold the wing assemblies 20.

When raising the tool bar 15 forwardly toward the transport position, the unfold finger 65 will become oriented within the support tower 66 as the tool bar 15 approaches the intermediate transport position. The unfold finger 65 can yield within the lost motion links 65a against the third link support members 63 until the wing fold hydraulic cylinders 29 are retracted to effect a pivotal folding of the wing members 21, at which time the third link support members 63 will pivot in an outboard directions until engaging the first abutments 64 to provide a support against which the wing fold cylinders 29 can work. When this event occurs, the float gap within the support tower between the third link support members 63 opens up so that the unfold finger 65 can fall therebetween. To unfold the planting implement 10, the hydraulic wing fold cylinders are actuated to extend causing the third link support members 63 to pivot in an inboard direction until impacting the unfold finger 65 which is located therebetween. The unfold finger 65 thereby provides support against which the wing fold cylinders 29 can push to extend the wing members toward the operating position. When the tool bar 15 is then pivoted rearwardly by the main hydraulic cylinders 27, the support tower 66 moves rearwardly away from the unfold finger 65 until the implement 10 is against re-converted into the transport configuration.

Figure 19:
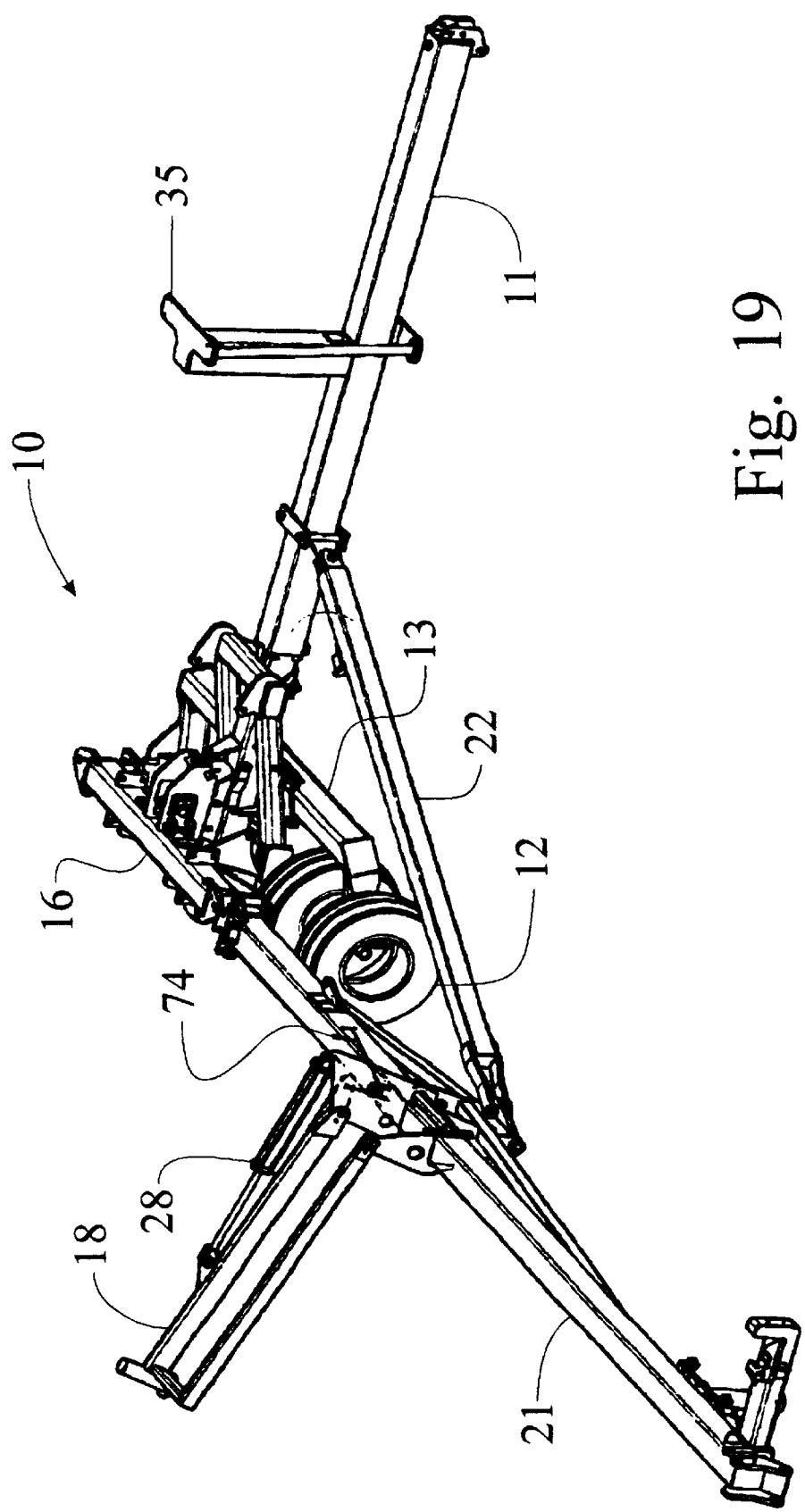
FIG. 19 is a schematic right side perspective view of a portion of a planting implement similar to that of FIG. 1, but showing an alternative embodiment with a lift assist mechanism.
Figure 20:
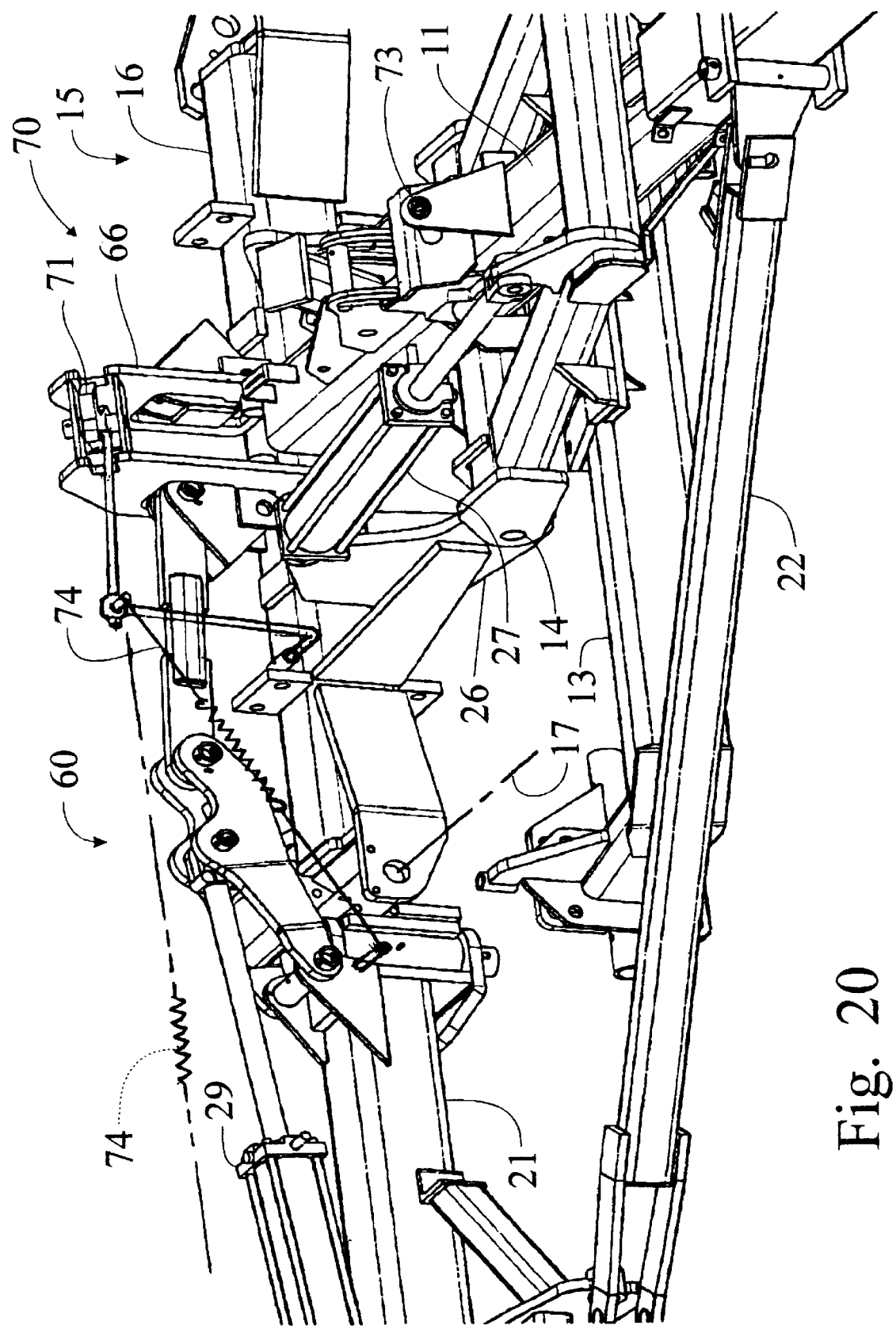
FIG. 20 is an enlarged right front perspective view of the portion of the implement of FIG. 18 where the draw bar intersects with the tool bar.
Figure 21:
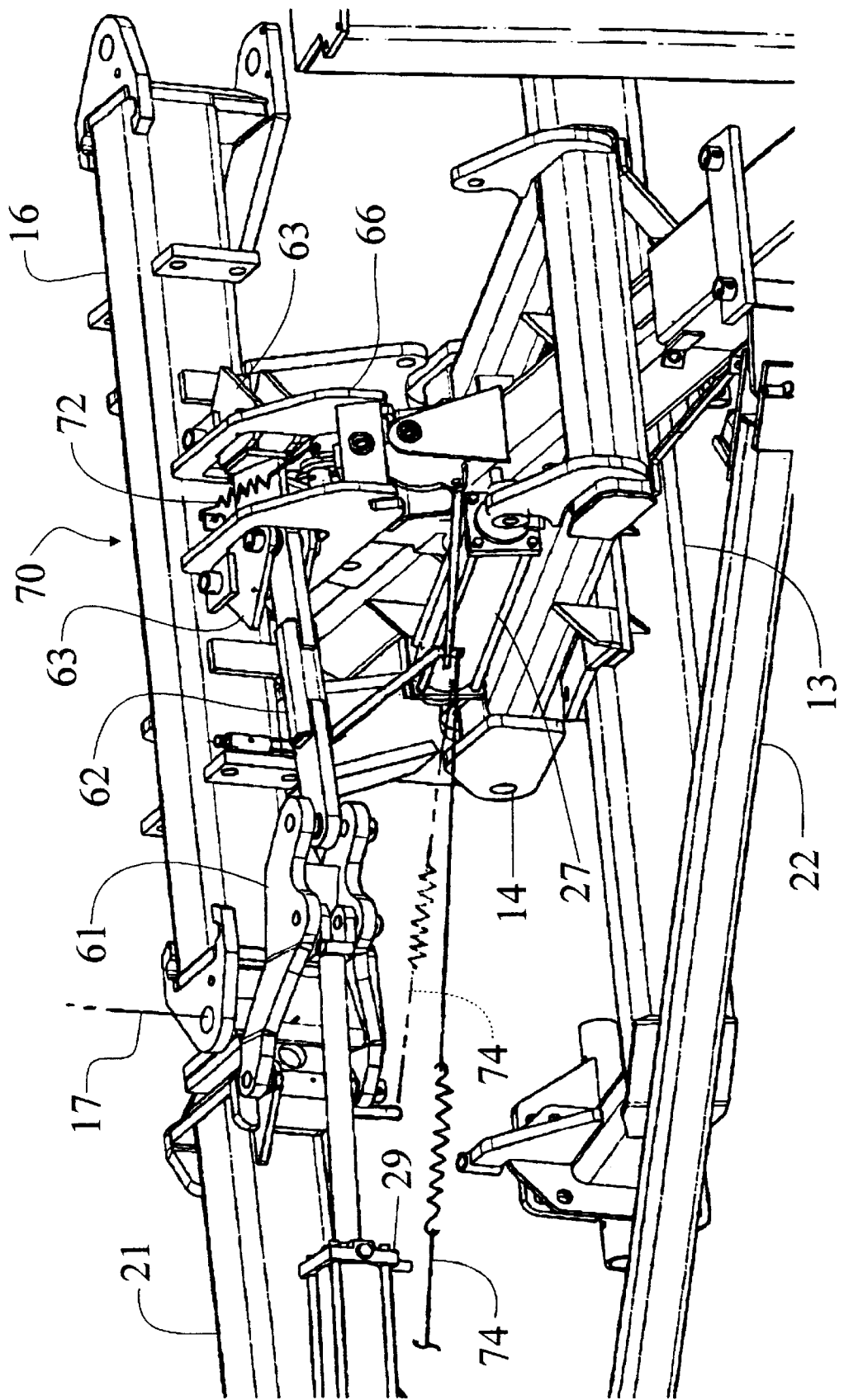
FIG. 21 is a right front perspective view similar to FIG. 20, but with the tool bar rotated to initiate the conversion of the implement from an operating configuration to a transport configuration.

Referring now to FIGS. 19–21, a tool bar lock mechanism 70 for the tool bar 15 can be seen. The tool bar lock 70 includes a pivoted lock clasp member 71 carried by the central part of the tool bar 15. The lock clasp member 71 is biased into a locking position by a lock spring 72 anchored on the tool bar 15. The lock clasp member 71 is movable into a position to engage a lock rod 73 carried by the draw bar 11 when the tool bar 15 is pivotally rotated to the forwardly rolled transport position, as is described in detail above. The pivotal movement of the lock clasp member 71 is controlled by a cable 74 interconnecting the lock clasp member 71 and a wing member 21. When the wing member 21 is pivoted out into a fully laterally extending position, as depicted in FIG. 19, the cable 74 pulls on the pivoted lock clasp member 71 to force a pivotal movement thereof in opposition to the lock spring 72 to pivotally move the lock clasp member 71 into an unlocked position. The folding of the wing member 21 toward a transport position, as described above, will relax the tension on the cable 74, allowing the cable 74 to go slack and permitting the biasing lock spring 72 to move the lock clasp member 71 into a locked position in engagement with the lock rod 73.

The cable 74 is either attached to the wing member 21 adjacent to and on the outboard side of the wing pivot axis 17 for standard (40 feet wide) versions, or to a lift assist mechanism (not shown) located on an outboard portion of a larger version (60 feet wide) of the tool bar 15 so that the toolbar lock mechanism 70 will not be disengaged until the lift assist mechanism 18 has been rotated to its downward limit so that the lift assist mechanism 18 will begin supporting the tool bar 15 when the tool bar 15 is rotated back more than about 30 degrees. The lift assist mechanism 18 provides assistance to the main tool bar hydraulic cylinders 27 under conditions where the overall length of the tool bar 15 is too great for the tool bar cylinders 27 to cause the forwardly rolling of the entire tool bar 15. Preferably, the lift assist mechanism 18 will support the remote distal end of the wing members 21 by a wheel 18a engaging the ground to provide support and assist in the raising of the tool bar 15 up to a position of approximately 60 degrees at which point the center of gravity is such that the cylinders 27 can effectively pivot the entire tool bar 15. The operation of the lift assistance mechanism 18 can be seen in reference to FIGS. 6A–6D, where the lift assist wheel 18a remains in contact with the ground until the tool bar 15 has been rotated sufficiently to allow the cylinders 29 to continue the effort unassisted.

Figure 22:
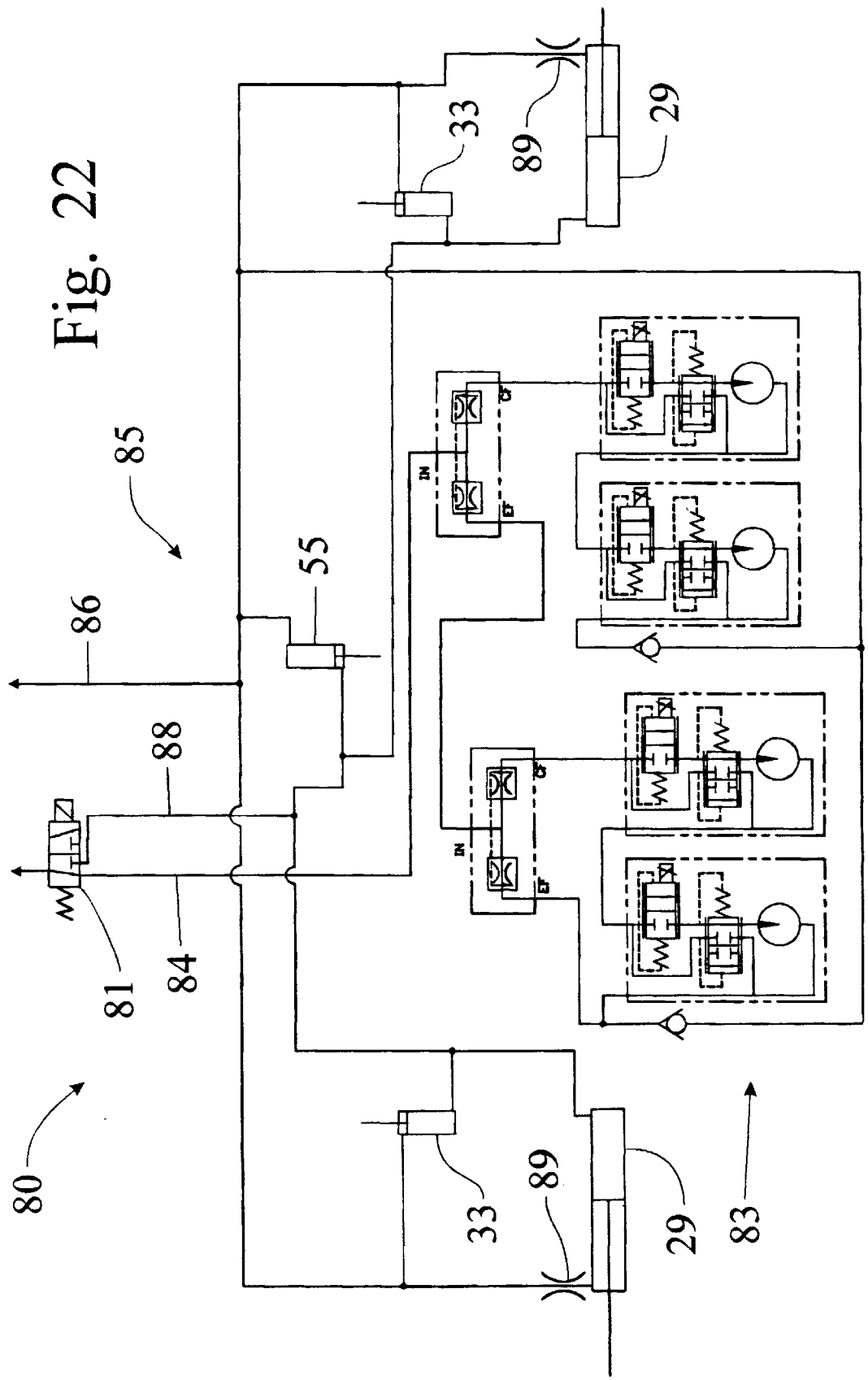
FIG. 22 is a schematic diagram of the hydraulic circuit for the folding of the implement between the operating and transport configurations, as well as actuation of the hitch latch and transport latch actuators.

Referring now to FIG. 22, a diagram of a portion of the hydraulic system 80 for the implement 10 operable as described in detail above can be seen. The implement hydraulic system 80 is connectable to conventional tractor hydraulics (not shown) to provide a source of hydraulic fluid under pressure. The hydraulic system 80 includes a selector valve 81 operable to alternatively direct the hydraulic fluid under pressure to either the hydraulic planter drive circuit 83 or the fold circuit 85 which includes the wing fold cylinders 29, the wing latch hydraulic cylinders 33, and the hitch latch hydraulic cylinder 55, which are operable as described in detail above. The fold circuit 85 is operable to effect the folding and unfolding of the implement 10 in the following manner:

Folding Sequence:

1. To convert the implement 10 from an operating configuration to a transport configuration, preferably an electronic control system is set from a planting mode to a folding mode. This action actuates a solenoid in the hydraulic circuit 80 to move the selector valve 81 blocking communication to the planter drive circuit 83 and opening communication with the fold circuit 85. This action also activates solenoids in the second hydraulic circuit 90 (FIG. 23) so that the field markers will be fully folded and to override the headland sensor 91. Hydraulic pressure is applied through line 92 to retract the tool bar actuators 27 and effect rotation of the tool bar 15 upwardly. Simultaneously, the inner and outer field marker actuators 93, 94 will be retracted if not already done so.

2. After the tool bar 15 has been rotated upwardly and forwardly, hydraulic pressure is applied to line 86 which simultaneously energizes the extension of the hitch latch actuator 55 and the retraction of the wing latch actuators 33 and the wing fold cylinders 29. The flow restrictors 89 on the wing fold cylinders 29 slow the speed of operation of the hydraulic circuit 85. The path of least resistance results in the extension of the hitch latch actuator 55 and the retraction of the wing latch cylinders 33. As a result, the actuation lever 56 opens the lower latch member 51 to release the telescopic draw bar 11.

3. Simultaneously, the wing latch actuators 33 rotate the respective latch hooks 31 to the locked position against the corresponding first abutments 34 while releasing the caster lock 40 by rotating the crank 42 until the slot 44 in the lost motion link 43 bottoms out and overcomes the spring force exerted by the spring 47 to disengage the caster lock hook 45 from the disk 48 on the caster wheel assembly 25, allowing the caster wheel 25 to freely rotate about a generally vertical axis. In this configuration, the biasing spring 47 now biases the wing latch hook 31 into the locked position against the first abutment 34.

4. Hydraulic pressure will now retract the wing fold cylinders 29 to pivot the wing members 21 about their now upright wing pivot axis 17 until the wing members 21 have been moved into the transport position shown in FIG. 8. The engagement of the wing latch hooks 31 with the latch retainer bar 36 allows the wing latch hooks 31 to open slightly against the biasing force exerted by the springs 47 to capture the latch retainer bar 36 and lock the wing members 21 in the transport position. As noted above, the forward folding of the wing members 21 causes the telescopic motion of the draw bar 11 by the braces 22 pushing on the forward draw bar portion 11b to force the rearward draw bar portion 11a rearwardly. Furthermore, the wing members 21 remain supported on the respective caster wheels 25 instead of being carried directly on the draw bar 11.

Unfold Sequence:

1. The planter controls will be set in the folding mode from previously folding the implement to the transport position. In this mode, valve 81 will direct hydraulic fluid under pressure to line 88 to energize the retraction of the hitch latch actuator 55 and the extension of the wing latch cylinders 33 and the wing fold cylinders 29. As noted above, the path of least resistance of the hydraulic circuit 85 is to the hitch latch actuator 55 and the wing latch cylinders 33. The hitch actuation lever 56 is pivoted to allow the spring 59 to bias the lower latch member 51 into the closed position; however, the rearward pivoting of the actuation lever 56 allows some freedom of movement of the lower latch member 51 against the spring 59.

2. Simultaneously, the wing latch cylinders 33 extend to pivot the wing latch hook 31 into an open position and to pivot the crank 42 to permit the spring 47 to bias the caster lock hook 45 against the disk 48. The second abutment 39 engages the crank 42 to allow the wing latch hook 31 to stay in the open position.

3. Hydraulic pressure then allows the wing fold cylinders to extend to return the wing members 21 to the transversely extending, field operating position. As the wing members 21 unfold rearwardly, the braces 22 pull the forward and rearward draw bar portions 11a and 11b together until the stop member engages the cam portion 53 of the latching tab 52 to force a downward motion in the lower latch member 51 against the spring 59 until the hitch latching mechanism 50 is fully engaged.

4. By pulling the implement 10 forwardly, the caster wheels 25 will align properly and allow the caster lock hook 45 to slip into the opening 49 on the disk member 48 to lock the caster wheels 25 in the forward direction while in the field operating mode.

5. The planter controls are selected from folding mode to planter mode to enable the tool bar 15 to be lowered to the working position. This switches valve 81 to communicate with line 84 and switches valve 101 in valve block 95 to the fully open position so the tool bar actuators 27 can be extended. A work position sensor (not shown), responsive to the position of the tool bar 15, maintains valves 103 and 104 in the closed position in which check valves do not allow extension of the markers via actuators 93, 94 until the tool bar 15 is lowered. Pressure is applied to the second hydraulic circuit 90 through line 99 to extend the tool bar actuators 27 to rotate the tool bar 15 rearwardly and downwardly, as described above, to move the tool bar 15 into a field operating position.

6. For the 60 foot version of the implement 10 provided with a lift assist mechanism 18, the lift assist mechanism 18 is lowered first for support of the tool bar 15 before lowering the tool bar 15. Pressure is first applied to line 92 to extend the lift assist actuators 28 until they become fully extended and the lift assist mechanism 18 is at its lowest limit, at which point a cable 74 disengages the tool bar lock 70 so that the tool bar can then be lowered. The tool bar lock 70 will prevent the actuators 27 from rotating the tool bar 15 until the lock 70 is released by the cable 74. Pressure is then applied to line 99 in the hydraulic circuit 90 to extend the tool bar actuators 27 while the tool bar 15 is rotated downwardly. Once the lift assist wheels 18a contact the ground, the lift assist actuators 28 will retract as the tool bar 15 continues to be lowered to the working position. A working position stop (not shown) stops the rotation of the tool bar 15 at the appropriate position corresponding to the working position.

7. Setting the control system to the planting mode in step 5 above enables the operation of the planter drive circuit 83. This also allows the headland sensor 91 to control the tool bar actuators 27 in the second hydraulic circuit 90. The operation of the field markers through the actuators 93, 94 can be controlled automatically or manually.

The operation of the headland sensor 91 will stop the rotation of the tool bar 15 upwardly, as though moving toward the intermediate transport position described above, at a position corresponding to approximately 30 degrees of rotation to raise the planting units 19a out of the ground to facilitate the turning of the implement 10 at the headlands of the field being planted. This limited rotation of the tool bar 15 places the planting units 19a in a raised position that can be quickly returned to the lowered planting or working position defined by the working position stop (not shown). As noted above, the operation of the headlands sensor is overridden by the shifting of the circuits 80,90 to the fold sequence.

Field markers are used on planters to place a mark in the unplanted ground so that the operator will know where to steer the tractor to keep the rows of crop made during each respective pass of the planting mechanism 10 evenly spaced. The structure and general operation of field markers are described in detail in Canadian Patent Application No. 2,252,296, filed Oct. 30, 1998, of Flexi-Coil Ltd., the corresponding U.S. patent application of David R. Hundeby, Ser. No. 09/428,526, being filed on October 28, 1999, and entitled "Field Marker for Agricultural Implement", the description of which is incorporated herein by reference. Deployment of the field markers generally requires operator input to retract one field marker and extend the opposing field marker as the tractor and implement are making a turn at the headlands of the field.

Figure 23:
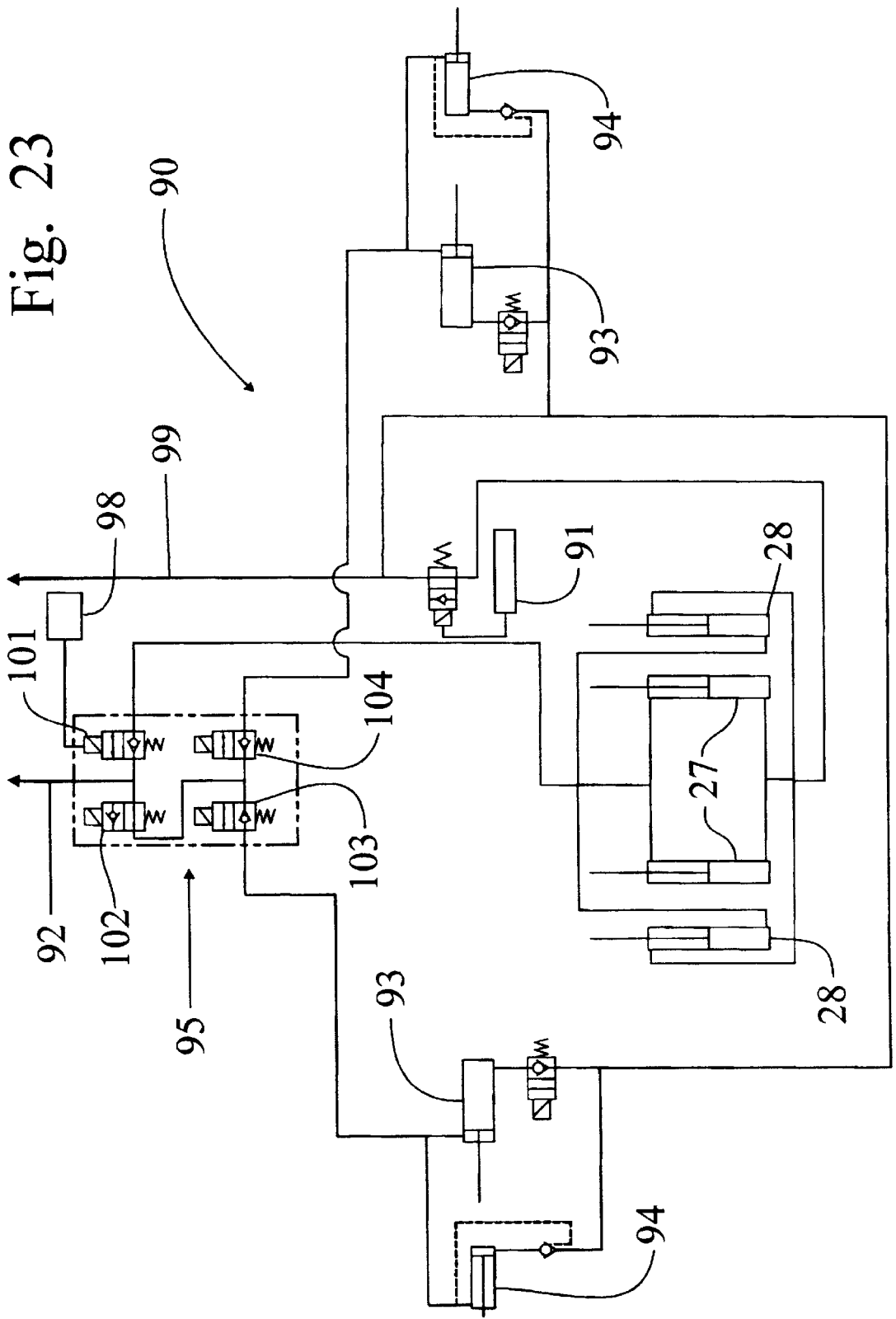
FIG. 23 is a schematic diagram of the hydraulic circuit for controlling the rotation of the tool bar, including actuators for the lift assist mechanism for the 60 foot version of the planting implement.
Figure 24:
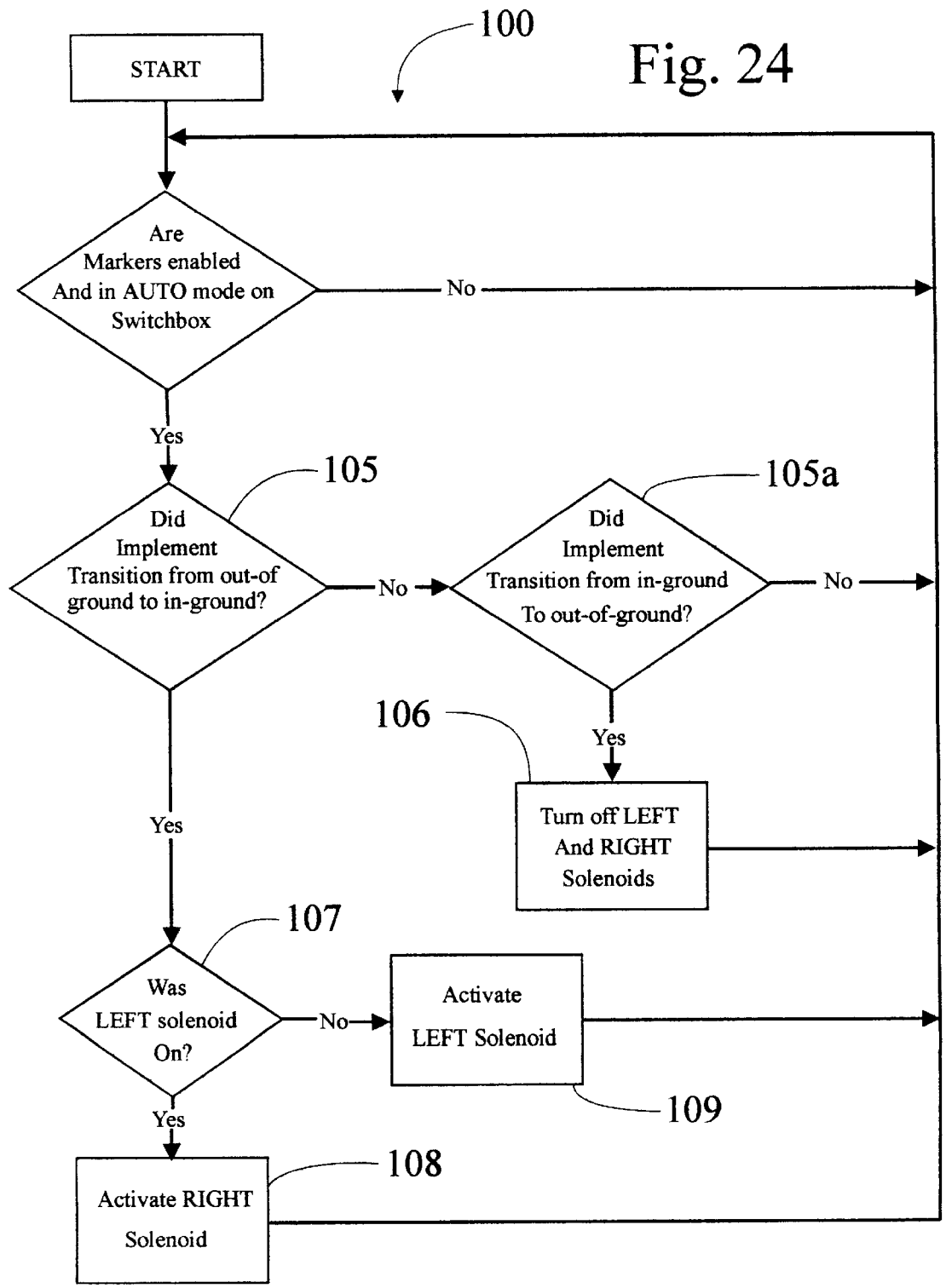
FIG. 24 is logic flow diagram for the operation of the control system for automating the sequencing of the field markers when the planting implement is turned at the headlands.

As shown in FIG. 23 and 24, the planting implement 10 includes a control mechanism 100 that is effective during the planting operation upon the raising of the tool bar 15 at the headlands to operate automatically the outer field marker actuators 94 to alternately fold one marker while deploying the other. A manual control (not shown) will allow the deployed marker to be raised to avoid an obstacle. Once the control system 100 is set in an AUTO mode and the valve 102 controlling the flow of hydraulic fluid to the marker actuators 93, 94 is moved to the on position, the control system 100 will extend and retract the left and right field markers in an alternating manner automatically when the tool bar 15 is raised to the headlands position depicted in FIG. 6B, and then lower the appropriate field marker for travel in the opposite direction when the tool bar 15 is returned to the working position depicted in FIG. 6A. Providing this fumction automatically enables the operator to remain attentive to the turning of the tractor and implement at the headlands and setting the planting implement 10 in the ground at the proper location for planting the crop.

Preferably, the control system 100 will include a first switch for enabling the system and a second switch for placing the control system in the AUTO mode. A third switch will control the first hydraulic system 80 between a fold operation and a planting operation, as is described above, and a fourth switch is operable for enabling either the inner marker actuators 93 or the outer marker actuators 94, or both the inner and outer marker actuators 93, 94 together. A work switch 98 is preferably a proximity sensor mounted on the tool bar 15 to provide a signal to the control system 100 to indicate whether the tool bar 15 is moving toward the lowered working position (in-ground) or toward the raised headlands position (out-of-ground). The control system 100 also has a memory capability to recall which of the marker valves 103, 104 was last placed in the on or open position, and thereby actuating the corresponding left or right marker actuators.

When actuated by the operator, the control system 100 will direct hydraulic fluid under pressure to move the opposing left and right marker actuators appropriately with the movement of the tool bar between working and headlands positions. Once the control system 100 is set in the AUTO mode, the control system checks at step 105 and 105a to determine through the proximity sensor 98 whether the tool bar 15 is moving upwardly toward the headlands position or downwardly toward the working position. If the tool bar 15 is moving upwardly toward the headlands position, the left and right solenoids are both moved to the off positions at step 106 to effect the retraction of both field markers, although only one of which would have been deployed.

If at query 105, the tool bar 15 was moving downwardly toward the working position, the system 100 checks at step 107 to recall if the left solenoid, as opposed to the right solenoid, had been the last one actuated. If at step 107 the left solenoid had been the last one actuated, then the system 100 at step 108 activates the right solenoid to deploy the opposite field marker. If at step 107, the left solenoid had not been the last solenoid actuated, then at step 109, the left solenoid is actuated to deploy the left field markers, which would be opposite to the previously deployed right field markers.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing is description illustrates the preferred embodiment of the invention; however, concepts, as based upon the description, may be employed in other embodiments without departing from the scope of the invention.

Having thus described the invention, what is claimed is:

1. In an agricultural implement supporting ground working devices, said agricultural implement having a draw bar adapted for connection to a prime mover; and a tool bar connected to said draw bar and including left and right wing members pivotally movable about a wing pivot axis relative to said draw bar, each of said wing members having a distal end laterally spaced from a longitudinal center of said implement, the improvement comprising:

said tool bar being pivotally mounted on said draw bar for rotational movement about a generally transversely extending pivot axis between a horizontally oriented working position and a vertically oriented transport position, such that said tool bar rotates through an angular displacement of approximately 90 degrees; and a lift assist mechanism mounted on each said wing member and extending rearwardly thereof to support the distal end of said wing member as said tool bar is being rotated from said working position toward said transport position.

2. The agricultural implement of claim 1 wherein each said lift assist mechanism comprises:

a sub-frame member having a first end pivotally attached to the corresponding said wing member and a second end extending in a fore-and-aft direction from said first end;

a lift assist wheel mounted on said second end for support thereof above the ground; and a lift assist actuator interconnecting said wing member and said sub-frame to control the pivotal movement of said sub-frame about said first end.

3. The agricultural implement of claim 2 wherein said tool bar is pivotally moved between said working position and said transport position by an tool bar actuator, said lift assist actuator and said tool bar actuator being coupled to a common control circuit so that said lift assist actuator pivotally moves said sub-frame relative to the corresponding said wing member as said corresponding wing member is being rotated by said tool bar actuator about said transverse pivot axis.

4. The agricultural implement of claim 3 wherein the coordinated movement of said lift assist actuator with said tool bar actuator is operable to keep said lift assist wheel on the ground for a predetermined period as said tool bar is being moved from said working position toward said transport position.

5. The agricultural implement of claim 4 wherein said lift assist wheel is retained in contact with the ground to provide support for said distal end of the corresponding said wing member through approximately 60 degrees of rotation of said tool bar.

6. The agricultural implement of claim 5 wherein said tool bar further includes a tool bar lock mechanism having a releasable latch, said lift assist mechanism further comprising a connection between one of said sub-frames and said tool bar lock mechanism to effect a release of said tool bar lock latch after said lift assist mechanism has been moved into a predetermined position for appropriate support of said distal ends of said wing members.

7. The agricultural implement of claim 6 wherein said connection comprises a cable interconnecting said one sub-frame and said releasable latch to effect a release of said latch when said one sub-frame has been moved to said predetermined position.

8. The agricultural implement of claim 7 wherein said lift assist mechanism is positioned intermediate of said center of said implement and said distal end of the corresponding said wing member.

9. An agricultural implement comprising:

a draw bar adapted for connection to a prime mover;

a tool bar connected to said draw bar and including left and right wing members pivotally movable about a corresponding wing pivot axis relative to said draw bar, each of said wing members having a distal end laterally remote of a center of said implement, said tool bar being pivotally connected to said tool bar to be rotatable about a generally transverse pivot axis between a lowered working orientation and a raised transport orientation, said tool bar rotating through an annular displacement of approximately 90 degrees between said working and transport orientations, each said wing member having a wheel assembly proximate to the corresponding distal end for support thereof, a tool bar actuator for effecting the pivotal movement of said tool bar;

a lift assist mechanism pivotally mounted on each said wing member and extending rearwardly thereof to support said distal end of the respective said wing member as said tool bar is being rotated from said lowered working orientation toward said raised transport orientation; and a lift assist actuator interconnecting each respective said lift assist mechanism and the corresponding said wing member to control the pivotal orientation of said lift assist mechanism relative to said corresponding wing member.

10. The agricultural implement of claim 9 wherein said tool bar actuator and said lift assist actuators are operatively controlled through a common control circuit such that said lift assist actuators pivot said lift assist mechanism relative to said wing member to maintain support of the corresponding distal end as said tool bar is being rotated from said working orientation toward said transport orientation.

11. The agricultural implement of claim 10 wherein said lift assist mechanism comprises:

a sub-frame member having a first end pivotally attached to the corresponding said wing member and a second end extending rearwardly of said first end; and a lift assist wheel mounted on said second end for support thereof above the ground.

12. The agricultural implement of claim 11 wherein said lift assist actuator is operable to pivot said sub-frame to maintain said lift assist wheel in contact with the ground until said tool bar has been rotated through a predetermined angle of rotation.

13. The agricultural implement of claim 12 wherein said predetermined angle of rotation is approximately 60 degrees from said working orientation toward said transport orientation.

14. The agricultural implement of claim 13 wherein said tool bar further includes a tool bar lock mechanism having a releasable latch, said lift assist mechanism further including a cable interconnecting one of said sub-frames and said tool bar lock mechanism to effect a release of said tool bar lock latch after said lift assist mechanism has been moved into a predetermined position for appropriate support of said distal ends of said wing members.

15. An agricultural implement comprising:

a draw bar adapted for connection to a prime mover;

a tool bar pivotally connected to said draw bar for movement about a generally transverse pivot axis between a rearward working position and a forward transport position, said tool bar including left and right wing members pivotally movable about a corresponding wing pivot axis relative to said draw bar between a laterally extending operating position and a forwardly folded transport position, each of said wing members having a distal end;

a tool bar lock mechanism;

a lift assist mechanism for supporting the distal end of each said wing member as said tool bar is being pivotally rotated from said rearward working position toward said forward transport position, said lift assist member including:

a frame member having a first end pivotally connected to the corresponding said wing member and a second end trailing rearwardly of said first end;

a lift assist wheel mounted on said trailing second end of said frame; and a hydraulic lift assist actuator interconnecting said frame and the corresponding said wing member to control the pivotal movement of said frame relative to the respective said wing member;

a cable connected to said tool bar lock mechanism to effect a release of said tool bar lock after said lift assist mechanism has been moved into a predetermined position for appropriate support of said distal ends of said wing members when said tool bar is to be moved from said transport position toward said working position; and a hydraulic circuit operably connected to said lift assist actuator to control the pivotal movement of said frame so as to maintain said lift assist wheel in supporting contact with the ground as said tool bar is being pivotally rotated from said rearward working position toward said transport position until said tool bar has been moved to a predetermined position.

16. The agricultural implement of claim 15 wherein said lift assist actuator is operable to pivot said sub-frame to maintain said lift assist wheel in contact with the ground until said tool bar has been rotated through a predetermined angle of rotation.

17. The agricultural implement of claim 16 wherein said predetermined angle of rotation is approximately 60 degrees from said working position toward said transport position.

18. The agricultural implement of claim 15 wherein each said wing member has a wheel assembly proximate to the corresponding distal end for support thereof in addition to the support provided by said lift assist mechanism.

19. The agricultural implement of claim 15 wherein said tool bar further includes a hydraulic tool bar actuator for effecting the pivotal movement of said tool bar between said working and transport positions, said tool bar actuator being operably connected to said hydraulic circuit in such a manner as to have a coordinated actuation thereof in conjunction with said lift assist actuator to maintain said lift assist wheel in supporting contact with the ground as said tool bar is being pivotally moved from said working position to said transport position.

* * * * *